United States Patent [19]
Mamin et al.

[11] Patent Number: 5,729,026
[45] Date of Patent: Mar. 17, 1998

[54] ATOMIC FORCE MICROSCOPE SYSTEM WITH ANGLED CANTILEVER HAVING INTEGRAL IN-PLANE TIP

[75] Inventors: Harry Jonathon Mamin, Palo Alto; Robert Paul Ried, San Jose; Daniel Rugar, Los Altos; Bruce David Terris, Sunnyvale, all of Calif.

[73] Assignee: International Business Machines Corporation, Armonk, N.Y.

[21] Appl. No.: 712,739

[22] Filed: Aug. 29, 1996

[51] Int. Cl.$^6$ ............................................. H01J 37/26
[52] U.S. Cl. ........................... 250/492.2; 250/306
[58] Field of Search ............................ 250/306, 307, 250/492.2; 73/105

[56] References Cited

U.S. PATENT DOCUMENTS

| | | | |
|---|---|---|---|
| Re. 33,387 | 10/1990 | Binnig | 250/306 |
| 4,943,719 | 7/1990 | Akamine et al. | 250/306 |
| 4,968,585 | 11/1990 | Albrecht et al. | 430/320 |
| 5,021,364 | 6/1991 | Akamine et al. | 437/228 |
| 5,051,379 | 9/1991 | Bayer et al. | 437/225 |
| 5,066,358 | 11/1991 | Quate et al. | 156/647 |
| 5,239,863 | 8/1993 | Kado et al. | 250/306 |
| 5,245,187 | 9/1993 | Kawase et al. | 250/306 |
| 5,270,543 | 12/1993 | Visser et al. | 250/306 |
| 5,319,961 | 6/1994 | Matsuyama et al. | 73/105 |
| 5,345,815 | 9/1994 | Albrecht et al. | 73/105 |
| 5,356,218 | 10/1994 | Hopson et al. | 250/306 |
| 5,357,787 | 10/1994 | Kado et al. | 73/105 |
| 5,367,165 | 11/1994 | Toda et al. | 250/306 |
| 5,386,110 | 1/1995 | Toda | 250/216 |
| 5,386,720 | 2/1995 | Toda et al. | 73/105 |
| 5,399,232 | 3/1995 | Albrecht et al. | 156/633 |
| 5,444,244 | 8/1995 | Kirk et al. | 250/306 |
| 5,455,419 | 10/1995 | Bayer et al. | 250/306 |
| 5,537,372 | 7/1996 | Albrecht et al. | 369/43 |

FOREIGN PATENT DOCUMENTS

WO 94/29894  12/1994  WIPO.

OTHER PUBLICATIONS

G. Binnig et al., "Atomic Force Microscope", Physical Review Letters, vol. 56, No. 9, Mar. 3, 1986, pp. 930–933.

B. W. Chui et al., "Improved Cantilevers for AFM Thermomechanical Data Storage", Proceedings of Solid–state Sensor and Actuator Workshop, Hilton Head, SC, Jun. 2–6, 1996, pp. 219–224.

P. Grütter et al., "Magnetic Force Microscopy with Batch–fabricated Force Sensors", Journal of Applied Physics, vol. 69, No. 8, Apr. 15, 1991, pp. 5883–5885.

T. Hirano et al., "Electroplated and Dry–released Metallic Microstructures for a Lateral Tunneling Unit Application", Japanese Journal of Applied Physics, vol. 33, Part 1, No. 2, 1994, pp. 1202–1208.

S. Hoen et al., "Thermomechanical Data Storage Using a Fiber Optic Stylus", Applied Physics Letters, vol. 64, No. 3, Jan. 17, 1994, pp. 267–269.

D. Kobayashi et al., "An Integrated Lateral Tunneling Unit", Proceedings of the IEEE Micro Electromechanical Systems Workshop, Travemunde, Germany, Feb. 4–7, 1992, pp. 214–219.

(List continued on next page.)

*Primary Examiner*—Kiet T. Nguyen
*Attorney, Agent, or Firm*—Thomas R. Berthold

[57] ABSTRACT

An atomic force microscope system incorporates a single-crystal silicon cantilever with an integral tip. The cantilever is supported in the AFM system so that it makes an acute angle with the surface of the sample to be scanned. The tip is formed by the convergence of three planes, one of which is one of the two generally parallel planes which define the thickness of the cantilever. The tip lies between the cantilever's two thickness-defining planar surfaces and is thus an in-plane integral tip. The AFM system may have the cantilever surface that converges to the tip oriented to either face the sample or face away from the sample.

25 Claims, 30 Drawing Sheets

OTHER PUBLICATIONS

J. Liu et al., "Electron Emission from Diamond Coated Silicon Field Emitters", Applied Physics Letters, vol. 65, No. 22, Nov. 28, 1994, pp. 2842–284.

M. I. Lutwyche et al., "Manufacture of Micromechanical Scanning Tunnelling Microscopes for Observation of the Tip Apex in a Transmission Electron Microscope", Sensors and Actuators, vol. A, No. 48, 1995, pp. 127–136.

A. Majumdar et al., "Nanometer-scale Lithography Using the Atomic Force Microscope", Applied Physics Letters, vol. 61, No. 19, Nov. 9, 1992, pp. 2293–2295.

Y. Martin et al., "High-resolution Magnetic Imaging of Domains in TbFe by Force Microscopy", Applied Physics Letters, vol. 52, No. 3, Jan. 18, 1988, pp. 244–246.

G. Meyer et al., "Simultaneous Measurement of Lateral and Normal Forces with an Optical-beam-deflection Atomic Force Microscope", Applied Physics Letters, vol. 57, No. 20, Nov. 12, 1990, pp. 2089–2091.

S. C. Minne et al., "Fabrication of 0.1 μm Metal Oxide Semiconductor Field-effect Transistors with the Atomic Force Microscope", Applied Physics Letters, vol. 66, No. 6, Feb. 6, 1995, pp. 703–705.

S. C. Minne et al., "Atomic Force Microscope Lithography Using Amorphous Silicon as a Resist and Advances in Parallel Operation", Journal of Vacuum Science Technology B, vol. 13, No. 3, May/Jun. 1995, pp. 1380–1385.

L. L. Sohn et al., "Fabrication of Nanostructures Using Atomic-force-microscope-based Lithography", Applied Physics Letters, vol. 67, No. 11, Sep. 11, 1995, pp. 1552–1554.

T. Stowe et al., "Ultrasensitive Vertical Force Probe for Magnetic Resonance Force Microscopy", Proceedings of Solid-state Sensor and Actuator Workshop, Hilton Head, SC, Jun. 2–6, 1996, pp. 225–230.

B. D. Terris et al., "Localized Charge Force Microscopy", Journal of Vacuum Science Technology A, vol. 8, No. 1, Jan./Feb. 1990, pp. 374–377.

M. Wendel et al., "Sharpened Electron Beam Deposited Tips for High Resolution Atomic Force Microscope Lithography and Imaging", Applied Physics Letters, vol. 67, No. 25, Dec. 18, 1995, pp. 3732–3734.

Section 2f - 2f

Section 2g - 2g

ATOMIC FORCE MICROSCOPE SYSTEM WITH ANGLED CANTILEVER HAVING INTEGRAL IN-PLANE TIP

TECHNICAL FIELD

This invention was made with Government support under contract DABT63-95-C-0019 awarded by the Defense Advanced Research Projects Agency of the U.S. Department of Defense. The Government has certain rights in this invention.

This invention relates to atomic force microscope (AFM) systems that employ a microfabricated cantilever having a probe or tip at its free end for scanning the surface of a sample.

RELATED APPLICATIONS

This application and copending concurrently-filed application, Ser. No. 08/711,713, are based on a common specification. This application is directed to "ATOMIC FORCE MICROSCOPE SYSTEM WITH ANGLED CANTILEVER HAVING INTEGRAL IN-PLANE TIP", and application Ser. No. 08/711,713 is directed to "SINGLE-CRYSTAL SILICON CANTILEVER WITH INTEGRAL IN-PLANE TIP FOR USE IN ATOMIC FORCE MICROSCOPE SYSTEM".

BACKGROUND OF THE INVENTION

Atomic force microscopy is based upon the principle of sensing the forces between a sharp stylus or tip and the surface to be investigated. The interatomic forces induce the displacement of the tip mounted on the free end of a cantilever arm.

As described by Binnig et al., "Atomic Force Microscope", *Phys. Rev. Lett.*, Vol. 56, No. 9, Mar. 3, 1986, pp. 930–933, a sharply-pointed tip is attached to a spring-like cantilever beam to scan the profile of a surface to be investigated. The attractive or repulsive forces occurring between the atoms at the apex of the tip and those of the surface result in tiny deflections of the cantilever beam. In its original implementation, a tunneling junction was used to detect the motion of the tip attached to an electrically-conductive cantilever beam. An electrically-conductive tunnel tip is disposed within the tunnel distance from the back of the cantilever beam, and the variations of the tunneling current are indicative of the beam deflection. The forces occurring between the tip and the surface under investigation are determined from the measured beam deflection and the characteristics of the cantilever beam.

The principle of atomic force microscopy has been extended to the measurement of magnetic, electrostatic, and frictional forces, with the tip operating in either contact or near-contact with the surface of the sample. Magnetic force microscopy using a magnetized iron tip is described by Martin et al., "High-resolution Magnetic Imaging of Domains in TbFe by Force Microscopy", *Appl. Phys. Lett.*, Vol. 52, No. 3, Jan. 18, 1988, pp. 244–246. The use of silicon tips coated with a film of magnetic material, such as NiFe or CoPtCr, in magnetic force microscopy is described by Grütter et al., "Magnetic Force Microscopy with Batch-fabricated Force Sensors", *J. Appl. Phys.*, Vol. 69, No. 8, Apr. 15, 1991, pp. 5883–5885. Electrostatic force microscopy is described by Terris et al., "Localized Charge Force Microscopy", *J. Vac. Sci. Technol. A*, Vol. 8, No. 1, January/February 1990, pp. 374–377. Frictional force microscopy is described in Meyer et al., "Simultaneous Measurement of Lateral and Normal Forces with an Optical-beam-deflection Atomic Force Microscope", *Appl. Phys. Lett.*, Vol. 57, No. 20, Nov. 12, 1990, pp. 2089–2091. As in atomic force microscopy as originally conceived by Binnig et al., the forces in all of these techniques are determined from the measured beam deflection and the characteristics of the cantilever beam. It can be argued that whereas magnetic, van der Waals, electrostatic, and frictional forces differ in magnitude and range of interaction, they are all ultimately atomic in nature. Accordingly, the term "atomic force microscope" as used herein includes any scheme in which a tip attached to a cantilever is moved with respect to a surface, and the deflection of the cantilever is used to ascertain the force exerted on the tip by the sample, regardless of the range or origin of the interaction between the tip and the sample.

In addition to tunneling detection, several other methods of detecting the deflection of the AFM cantilever are available, including optical interferometry, optical beam deflection, capacitive techniques, and more recently piezoresistance. Optical beam deflection is currently the most common form of detection used in commercial instruments.

The principle of piezoresistance to detect the deflection of the AFM cantilever is described in U.S. Pat. No. 5,345,815. The cantilever is formed of single-crystal silicon which is implanted with a dopant to provide a piezoresistive region along the length of the cantilever. Deflection of the free end of the cantilever produces stress in the cantilever. That stress changes the electrical resistance of the piezoresistive region in proportion to the cantilever's deflection. A resistance measuring apparatus is coupled to the piezoresistive region to measure its resistance and to generate a signal corresponding to the cantilever's deflection. Moving a cantilever across a sample for scanning is relatively straightforward with piezoresistive detection in comparison to optical detection, for which external optics must move with the cantilever.

AFM systems have applications beyond their original application of imaging the surface of a sample.

AFM systems have been proposed for data storage, as described in U.S. Pat. No. 5,537,372. In that application, the cantilever tip is in physical contact with the surface of a data storage medium. The medium has surface incongruencies in the form of bumps and/or depressions that represent data. The deflection of the cantilever is detected and decoded to read the data. Data can also be written on the medium, if the medium has a heat-deformable surface, by heating the cantilever tip when it is in contact with the medium surface to form bumps or depressions on the medium surface. The tip is heated by a laser beam directed to the tip region of the cantilever. In another approach for heating the tip, as described in Chui et al., "Improved Cantilevers for AFM Thermomechanical Data Storage", *Proceedings of Solid-State Sensor and Actuator Workshop*, Hilton Head, S.C., Jun. 2–6, 1996, pp. 219–224, a single-crystal silicon cantilever is selectively doped with boron to provide a conductive path to an electrically-resistive region near the cantilever tip. The tip is then resistively heated when current is passed through the conductive path.

AFM systems have also been proposed for direct writing or lithographically patterning the surface of a semiconductor sample. This technique is referred to as AFM-based lithography or scanning probe lithography (SPL). One type of SPL is described in Minne et al., "Fabrication of 0.1 μm Metal Oxide Semiconductor Field-effect Transistors with the Atomic Force Microscope", *Appl. Phys. Lett.*, Vol. 66, No. 6, Feb. 6, 1995, pp. 703–705; and Minne et al., "Atomic Force Microscope Lithography Using Amorphous Silicon as a Resist and Advances in Parallel Operation", *J. Vac. Sci. Technol. B*, Vol. 13, No. 3, May/June 1995, pp. 1380–1385. In this type of SPL, the cantilever tip is in contact or near-contact with the semiconductor surface and an electrical potential can be applied between the tip and the semiconductor. The electric field between the tip and the semiconductor surface causes local oxidation on the surface of the semiconductor. As the tip is scanned across the surface and electric potential is cycled on and off in a controlled manner, insulative lines of the oxide are patterned on the semiconductor, which can then be used as a mask for further processing. In another form of SPL, described in Majumdar et al., "Nanometer-scale Lithography Using the Atomic Force Microscope", *Appl. Phys. Lett.*, Vol. 61, No. 19, Nov. 9, 1992, pp. 2293–2295, electrical current from a gold-coated AFM tip has been used to chemically modify a thin layer of the electron beam resist PMMA. After such exposure, a developing step is used to remove either the exposed or unexposed region, leaving a lithographic pattern of resist which can be used as a mask for further processing. Other types of SPL also involve modifying the surface of the semiconductor substrate through the use of a resist layer. For example, a technique of using an AFM tip to plow through the first of two layers of resist and then performing a development step is described in Sohn et al., "Fabrication of Nanostructures Using Atomic-force-microscope-based Lithography", *Appl. Phys. Lett.*, Vol. 67, No. 11, Sep. 11, 1995, pp. 1552–1554.

In prior art AFM systems, the cantilever tip is formed on the end of the cantilever to extend out of the plane of the cantilever in a direction generally perpendicular to the length of the cantilever. Thus, during scanning, the cantilever is oriented generally parallel to the sample and the tip extends downward perpendicularly toward the surface of the sample. This perpendicular out-of-plane tip is formed either as a separate structure added to the cantilever end, as shown in U.S. Pat. No. 5,357,787, or as an integral part of the cantilever, as shown in U.S. Pat. Nos. 5,021,364; 5,051,379; and 5,444,244.

It is desirable to make AFM cantilevers relatively thin. This reduces the mass of the cantilever, thereby allowing the AFM to operate at a higher frequency. Also, in the case of piezoresistive cantilevers for a fixed stiffness, the deflection sensitivity of the cantilever is inversely proportional to its thickness. However, it is difficult to combine the prior art integral out-of-plane perpendicular tips with thin, single-crystal silicon cantilevers. The integral tip is preferable, as it is mechanically more robust than a tip which is added in some way, either through gluing or deposition, as discussed in U.S. Pat. No. 5,357,787; and in Wendel et al., "Sharpened Electron Beam Deposited Tips for High Resolution Atomic Force Microscope Lithography and Imaging", *Appl. Phys. Lett.*, Vol. 67, No. 25, Dec. 18, 1995, pp. 3732–3734. In the particular case of an integral tip extending perpendicularly from the silicon cantilever, a significant amount of material must be removed, typically by an etching process. This tip-formation process is described in U.S. Pat. No. 5,444,244. The etching process makes it difficult to control the final thickness of the cantilever, and thus the desired stiffness, which is a function of the cube of thickness. It is also difficult to make out-of-plane tips out of single-crystal silicon with precisely-controlled geometries, as process variations can alter the final shape of the tip. Different shaped tips will in general have different resolving power, will withstand different amounts of stress in directions both parallel and perpendicular to the cantilever axis, and will also give rise to different degrees of wear. A controllable tip geometry allows the tip shape to be optimized for a particular application.

What is needed is an AFM system with a thin piezoresistive cantilever that can operate at high frequencies, has a cantilever tip integral with the cantilever arm, and can be easily manufactured with a controllable tip geometry.

SUMMARY OF THE INVENTION

The invention is an atomic force microscope system that incorporates a single-crystal silicon cantilever with an integral tip. The cantilever is supported in the AFM system so that it makes an acute angle with the surface of the sample to be scanned. The tip is formed by the convergence of three planes, one of which is one of the two generally parallel planes which define the thickness of the cantilever. The tip lies between the cantilever's two thickness-defining planar surfaces and is thus an in-plane integral tip. The AFM system may have the cantilever surface that converges to the tip oriented to either face the sample or face away from the sample.

For a fuller understanding of the nature and advantages of the present invention, reference should be made to the following detailed description taken together with the accompanying figures.

DESCRIPTION OF THE PREFERRED EMBODIMENTS

Overview of the System

Figure 1A:
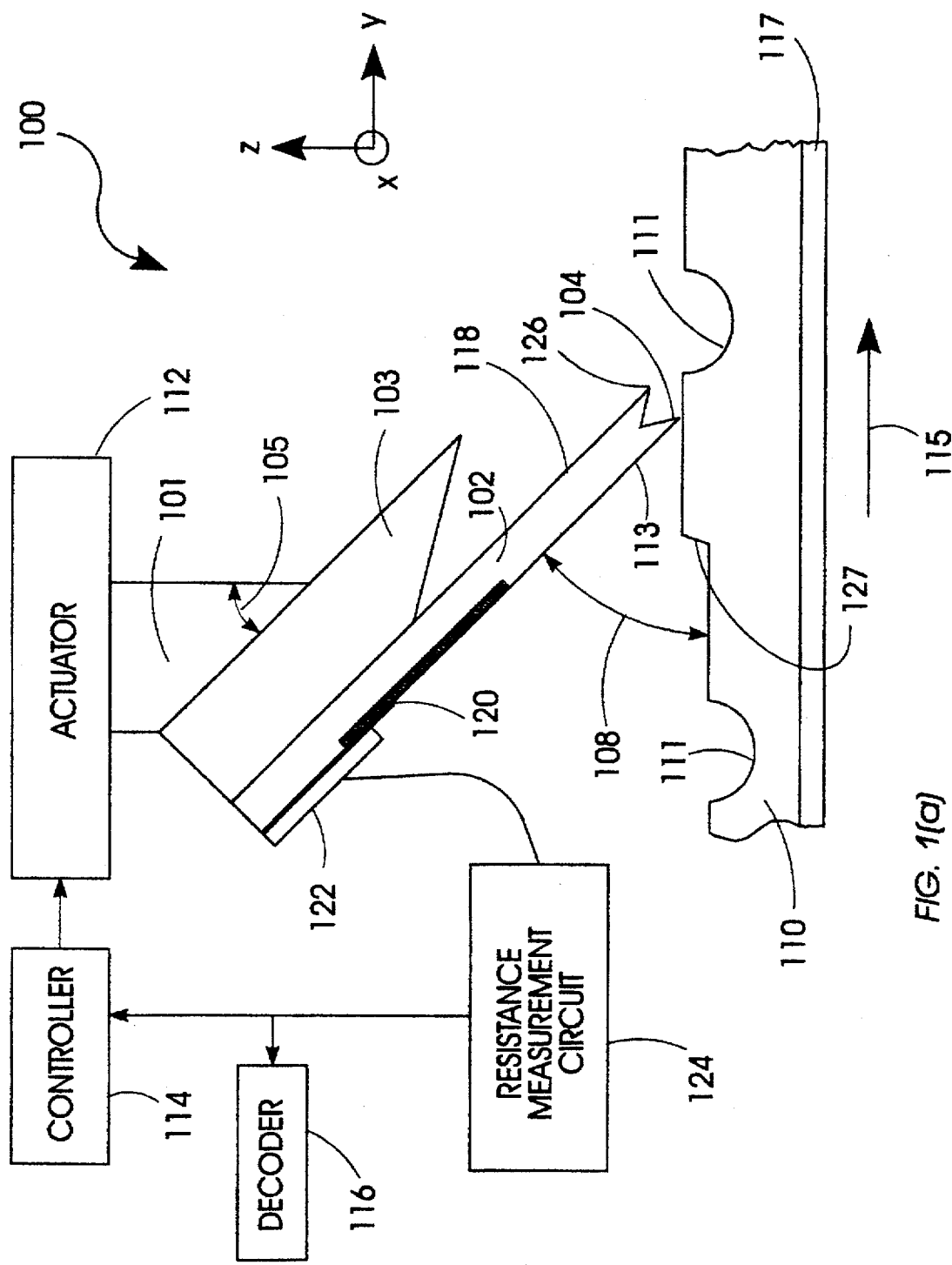
FIG. 1(a) is a block diagram of the AFM system of the present invention for use as a data readback system wherein the cantilever tip detects incongruencies on the surface of a recorded medium.

Referring to FIG. 1(a), there is shown a diagram of a data storage system 100 based on the atomic force microscope (AFM) concept and incorporating the present invention. A microfabricated cantilever arm 102 with a projecting in-plane integral tip 104 at its free end is used to detect surface incongruencies 111 on the sample 110. The cantilever has a "top" planar surface 113 and a "bottom" planar surface 118 that define the thickness of the cantilever. The end of the tip 104 is in the plane 113 of the cantilever 102. The tip 104 is the convergence of three planes, one of the planes being a plane of the cantilever, in this case plane 113 denoted as the top surface. The cantilever 102 is canted at an acute angle 108 with respect to the plane of the sample 110. The cantilever 102 is formed of single-crystal silicon and includes a piezoresistor 120, which is a boron-doped region near the base of the cantilever. The starting material for the cantilever is a conventional <100> silicon wafer which means that the wafer surface is normal to the <100> direction. As used herein, <hkl> is used to denote a class of directions in the silicon crystal, [hkl] is used to denote a specific direction, (hkl) is used to denote a specific crystalline plane, and {hkl} is used to denote a class of crystalline planes.

The tip 104 is in contact with the sample 110 and is moved relative to it, either by scanning the tip 104 or the sample 110. The sample to be scanned is held by a sample holder 117. For example, sample 110 can be a disk data medium that rotates beneath tip 104. The motion of the sample 110 relative to the tip 104 is generally in the direction away from the base 103 of the cantilever, as shown by the arrow 115. It may also be advantageous to move the medium in the X-direction for accessing different data tracks, for example. The incongruencies 111 represent data in machine-readable form. As the tip 104 encounters an incongruity 111 on the surface of sample 110, it causes the cantilever 102 to deflect. The deflection of the cantilever 102 by the surface incongruencies 111 changes the resistance of the piezoresistor 120 by an amount that is proportional to the cantilever deflection, as is known in the prior art, e.g., the previously-cited '815 patent. The piezoresistor 120 is coupled by a metal connector 122 to a resistance measurement circuit 124. The resistance of the piezoresistor 120 is continuously monitored and measured by the measurement circuit 124.

The cantilever 102 is integral with a base 103 that sits on a support 101. Support 101 couples the cantilever 102 to the actuator 112. If the sample 110 is in the X-Y plane, and the support 101 extends along the Z-direction, then the angle 105 at the attachment of base 103 to the support 101 induces the complementary angle 108 of the cantilever 102 relative to the surface of sample 110. The actuator 112 may be piezoelectric, electrostatic, or an electromagnetically-driven actuator, as in an optical disk drive or compact disk player, and is movable in some or all of the X, Y, and Z directions. For example, if sample 110 is a disk rotating about the Z axis, then the actuator 112 may move the tip 104 generally radially in the X-Y plane across the disk. Sample holder 117 would then be a hub or clamp that attaches the disk to a disk spindle motor (not shown).

As in the prior art, the system can be operated in either a "constant force" mode, or a "constant height" mode. It may also be operated in a combination thereof. In constant force mode, the movement of the actuator 112 in the Z-direction (perpendicular to sample 110) is controlled by a programmed computer or controller 114 which uses information obtained from the piezoresistor 120 as to the features on the sample surface. The signal sent to the actuator 112 from piezoresistor 120 can be used to maintain constant cantilever deflection, and thus a constant loading force on tip 104. In constant height mode, the actuator 112 does not move the cantilever 102 in the Z-direction so the cantilever deflects varying amounts as the surface incongruencies 111 pass under it. In combination mode, the controller 114 and actuator 112 are used to maintain generally constant loading force on a long time scale, taking out variations due to long-term drift, for example, or large features on the surface of the sample 110. The cantilever 102 is left free to deflect, however, as the tip 104 encounters the small surface incongruencies. In a data storage application, the combination mode is the preferred embodiment. In each case, however, the signal from the resistance measuring circuit 124 is used as the input to the decoder 116, which converts it to binary form, i.e., machine-readable information, in a manner well known in the art.

Figure 1B:
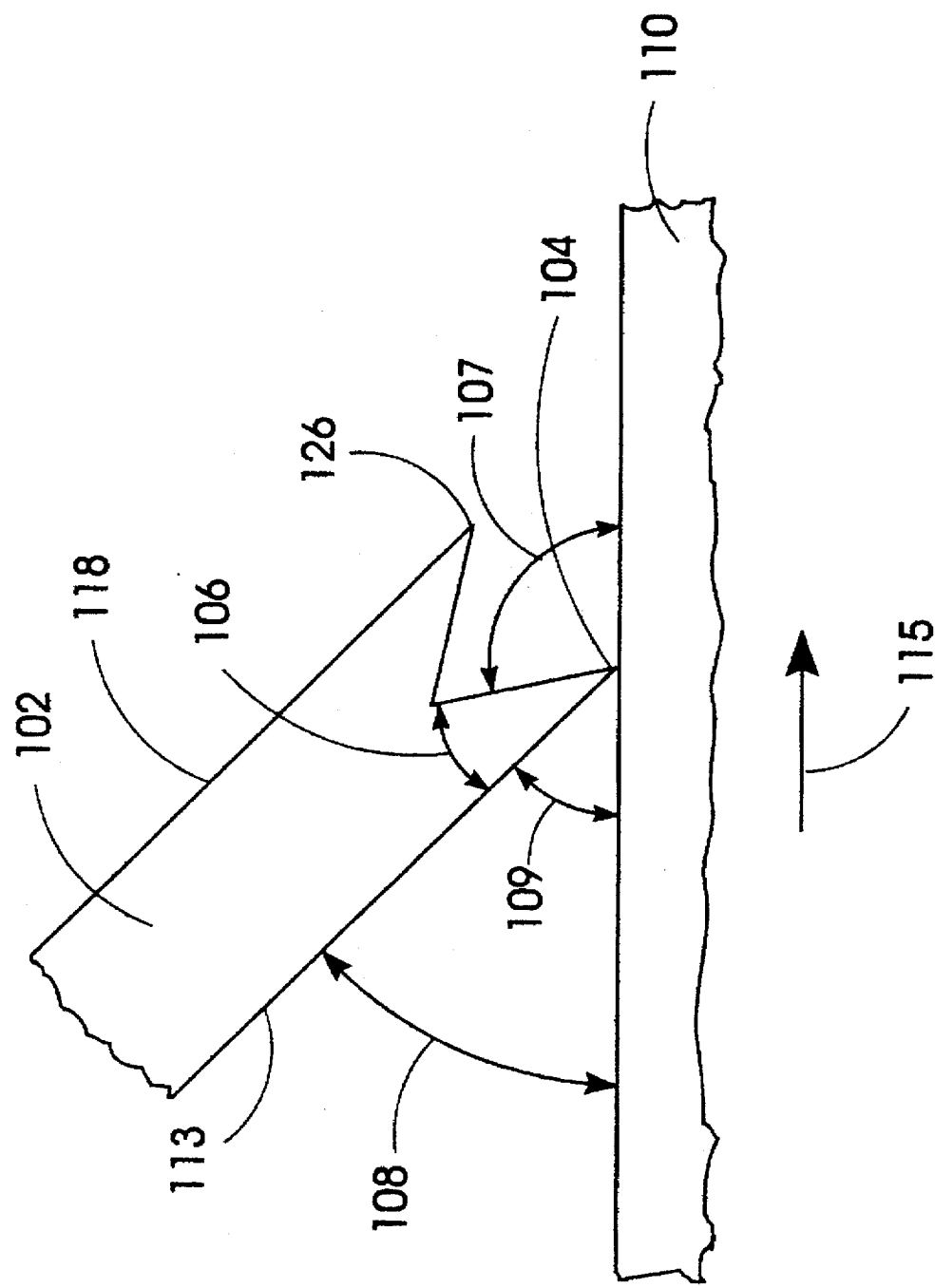
FIG. 1(b) is a diagram of the cantilever arm with the tip in contact with the surface of a sample to be scanned.

Referring now to FIG. 1(b), the attack angle 109 of the leading edge of the tip 104 is the same as the overall cantilever angle 108. The angle 109 is equal to 90° less angle 105, the angle of attachment of support 101 of actuator 112. The cone angle 106 is determined by the process of making the tip, which uses anisotropic etching of crystallographic planes as will be described below. The second tip 126 is a by-product of the fabrication process. The attack angle 107 of the trailing edge of tip 104 is given in this case by 180° less (angle 109+angle 106). It is an important feature of the tip 104 that the trailing edge attack angle 107 is easily set by proper choice of the support angle 105, and can be readily made greater than 90° by choosing (angle 105–angle 106) greater than 0. Equally important, the cone angle 106 can be arbitrarily set through photolithographic patterning. As is apparent from FIG. 1(b), the tip 104 is at the convergence of a part of the top plane 113 of cantilever 102, and thus will be referred to as an "in-plane" tip. The top planar surface 113 of the cantilever that converges to form the tip 104 is the surface that faces the surface of sample 110.

An advantage of the present invention over other silicon cantilevers made according to the prior art is that the use of the in-plane tip 104 allows the total thickness of the cantilever 102 to be very thin, on the order of 0.1 microns, as opposed to prior art thicknesses of 1–4 microns. The importance of this will be discussed below. In the prior art silicon cantilevers, an out-of-plane tip extends typically 2–5 microns out of the plane of the cantilever, i.e., normal to the top 113 or bottom 118 surface of the cantilever. It is very difficult to combine such an out-of-plane tip with a thin cantilever because of the process by which it is made. The out-of-plane tip is made by a subtractive process, which means the starting thickness of the cantilever material must be at least the height of the tip, i.e., 2–5 microns. Thus, to produce a thin cantilever, for example 0.5 micron, starting with a thickness of 5 microns, it is necessary to remove 90% of the initial thickness. A 5% variation in etch rates or initial thickness then leads to a 50% variation in cantilever thickness. Since the cantilever stiffness is a function of the cube of the thickness, this implies a variation in stiffness of $(1.5)^3$, or nearly 4×. Since it is difficult to control etch rates and initial silicon thickness to better than a few percent, the prior art is not suitable for making thin cantilevers with good uniformity.

Another advantage of the cantilever 102 over the prior art is that the in-plane tip 104 is an integral part of the cantilever 102 and does not add significant mass to it. In contrast, in the prior art, as the cantilever becomes thinner and shorter, the mass of an out-of-plane tip becomes more and more significant. Since the resonant frequency of the cantilever is a function of the inverse square root of the total mass, reducing the mass helps to raise the resonant frequency. The advantage of lower mass/higher resonant frequency is that it allows the tip to track the surface incongruencies at higher speed, leading to a higher data rate in data storage applications, as discussed in previously-cited U.S. Pat. No. 5,537,372. For AFM imaging applications, it allows for higher imaging speeds.

The motivation for reducing the thickness of the cantilever 102 is twofold. First, it further reduces the mass, allowing for higher frequency; and second, for a given stiffness, it allows for higher sensitivity of the piezoresistor 120. For a rectangular cantilever of length L, thickness t, and width w, the stiffness k can be written as $$k = \frac{1}{4} Ew \left( \frac{t}{L} \right)^3 \quad (1)$$

where E is the Young's modulus. The fundamental resonant frequency $f_0$ is given by $$f_0 = 0.162 \frac{t}{L^2} \sqrt{\frac{E}{\rho}} \quad (2)$$

where ρ is the density of the cantilever material. For many applications in which the tip is in contact with the sample, in particular for the data storage application described herein, the stiffness k is constrained to be below a certain value. As shown by Eq. (1), the desired stiffness k can be selected by appropriate design of the ratio t/L. The constraining of stiffness below a certain value allows for operation at low forces and prevents damage to the tip 104 or the sample 110. The expression for resonant frequency $f_0$ can be written in terms of the stiffness k as $$f_0 = 0.162 \frac{1}{\rho^{1/2}E^{1/6}} \left( \frac{4k}{w} \right)^{2/3} \frac{1}{t} \quad (3)$$

Thus, for a fixed spring constant k, selected by maintaining t/L a constant, the frequency scales as 1/t, where t is the thickness of the cantilever. This argues for making t as small as possible.

Similarly, the sensitivity of the piezoresistive cantilever 102 to a given deflection Δs is given in the previously-cited '815 patent by $$\frac{\Delta R}{R} = \frac{3\pi_L E t \Delta s}{4L^2} \quad (4)$$

where ΔR/R is the fractional change in resistance, and $\pi_L$ is the longitudinal piezoresistive coefficient. Here Δs refers to a deflection in a direction perpendicular to the plane of the cantilever. In terms of the deflection Δz in the Z-direction, normal to the plane of the sample, Δs is approximately equal to Δz/cosine(angle 108). In terms of stiffness k, this can be rewritten as $$\frac{\Delta R}{R} = 3\pi_L \left( \frac{k^2 E}{4w^2} \right)^{1/3} \frac{\Delta s}{t} \quad (5)$$

For a fixed stiffness k, selected by maintaining t/L a constant, the sensitivity scales as 1/t, again arguing for making the thickness as small as possible.

The process to be described below for making the cantilever 102 with in-plane tip 104 offers other significant advantages over prior art tips for AFMs in addition to allowing for thin cantilevers. In some schemes, the tips are defined through a high temperature oxidation process. In some cases, such high temperature processing needs to be avoided. For example, it can lead to diffusion of dopants, which may be undesirable. In addition, the final tip shape in the present invention is controllable and predictable. The cone angle 106 can be set arbitrarily according to the photolithographic patterning, as will be described below. In contrast, other crystallographic tips that lie within the plane of the cantilever, such as the perpendicularly-directed tip described by Stowe et al. in "Ultrasensitive Vertical Force Probe for Magnetic Resonance Force Microscopy", *Proceedings of Solid-State Sensor and Actuator Workshop*, Hilton Head, S.C., Jun. 2–6, 1996, pp. 225–230, have a fixed cone angle, are not in general sharp in all directions, and rely on defining crytallographic faces which are not stable under etching. This means the etch must be carefully timed to get a sharp tip, leading to a process which is not very tolerant to variations. Also, as compared to out-of-plane tips, the patterning in the present process is done on a surface which is relatively planar. The greater planarity of the tips allows for finer lithographic patterning, resulting in smaller feature size.

The in-plane tip leads to great flexibility in the choice of leading and trailing edge attack angles. Angle 109 can be easily set to any acute value through the proper choice of angle 105, set during system assembly. In contrast, a high aspect ratio out-of-plane tip is typically operated with the cantilever nearly parallel to the surface and a leading edge attack angle close to 90°. The leading edge attack angle 109 may be a significant factor in determining the wear on the sample 110. This occurs because the lower the leading edge attack angle, the lower the tangential forces needed to lift tip 104 over surface incongruencies 111 as tip 104 is scanned across sample 110. With an in-plane tip, the leading edge attack angle 109 can be easily set to significantly less than 90°, thereby reducing the wear compared to the wear which would be obtained with an out-of-plane tip with an attack angle closer to 90°. The in-plane tip 104 also gives the possibility of having the trailing edge attack angle 107 greater than 90°, which is difficult to achieve with out-of-plane tips. Having such a trailing edge angle helps the resolution for surface features for which the slope dz/dy is positive, such as the step 127 in FIG. 1(a). The fabrication process also allows for the cone angle of the tip in the X-direction to be very small (unlike other crytallographically-defined tips) so that high resolution in that direction is also achieved.

Figure 1C:
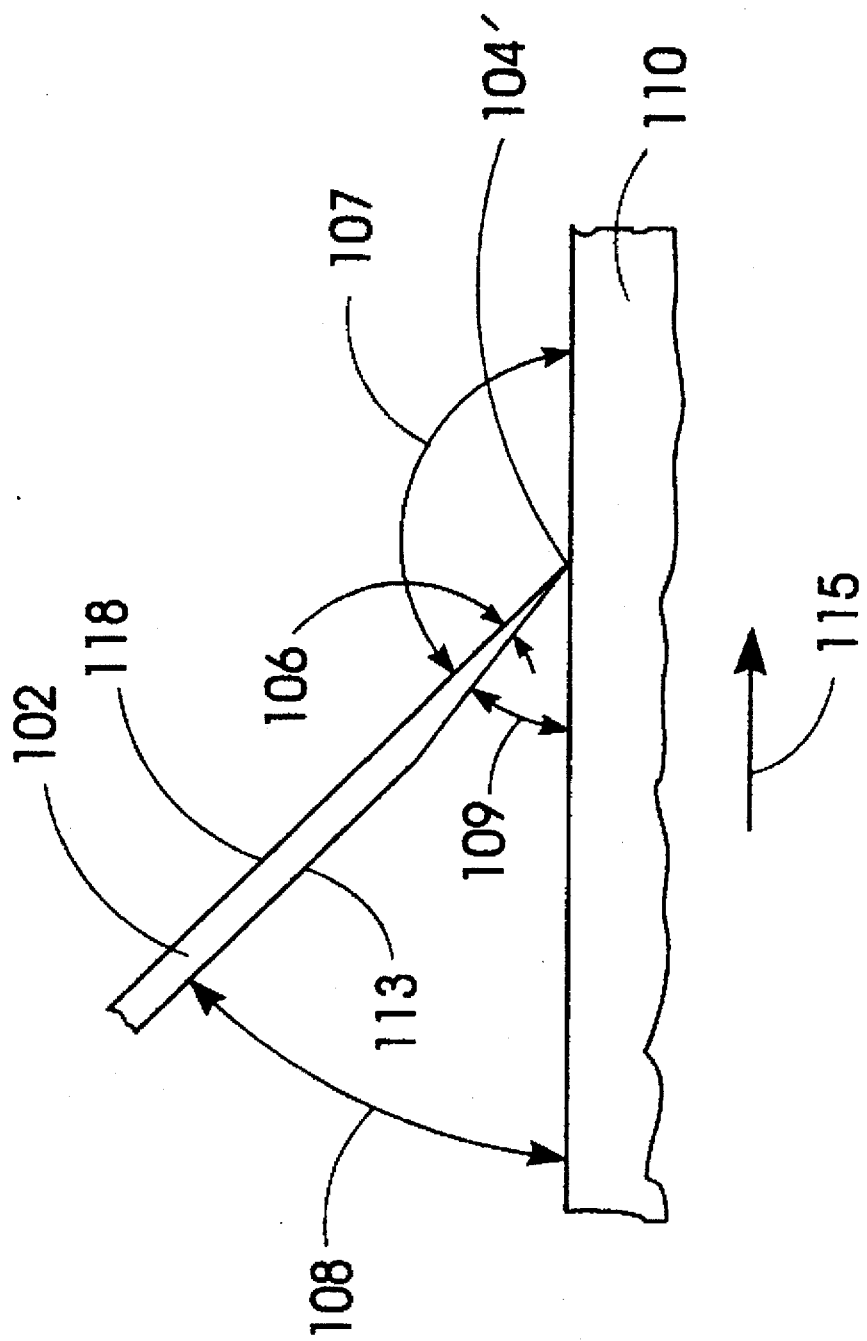
FIG. 1(c) is a diagram of an alternative embodiment of the cantilever arm with the tip in contact with the surface of a sample.

An alternative in-plane tip embodiment for cantilever 102 is shown in FIG. 1(c). In this case, the tip 104' is formed by the convergence of three planes, one of which is the "bottom" or trailing edge surface 118 of the cantilever 102. The leading edge attack angle 109 equals the cantilever angle 108 minus the cone angle 106. The trailing edge attack angle 107 is given by 180° less angle 108. This embodiment can be fabricated with one less processing step than the embodiment of FIG. 1(b), as will be explained below. It does have the feature, however, that to achieve a certain leading edge attack angle 109, the cantilever angle 108 must be set higher than in the previous case. A higher angle 108 makes the system somewhat less compact in the Z-direction and the cantilever somewhat less compliant in the Z-direction. In contrast to the embodiment of FIG. 1(b), in FIG. 1(c) the top planar surface 113 of the cantilever 102 is not the planar surface that converges to form the tip 104. The planar surface that converges to form the tip 104' is the "bottom" surface 118 that faces away from the surface of sample 110.

The above description of the angled piezoresistive cantilever with an in-plane tip has been presented as part of a data storage system. However, the invention is also applicable to other systems, such as a conventional AFM for use in imaging, as shown, for example, in the previously-cited '815 patent. In this case, the actuator 112 is replaced by an X-Y-Z actuator capable of scanning the tip 104 in three orthogonal directions. The signal from the controller 114 is then sent to a monitor, and is the some signal sent to the actuator stage, as in a conventional AFM. In this case, the surface incongruencies 111 on sample 110 do not represent machine-readable data, but rather are the features on the surface of the sample of interest which are to be imaged.

Piezoresistive detection for both AFM data storage and AFM imaging systems is not the only detection scheme that can be used with the cantilever of the present invention. Other schemes include capacitive readback and laser detection. Flat cantilevers with integral in-plane tips according to the present invention are well suited to capacitive detection, with the other electrode formed by either the lower silicon substrate or an electrode which has been deposited above the cantilever. Laser detection requires sufficient etching to make the cantilever visible from the back.

Figure 1D:
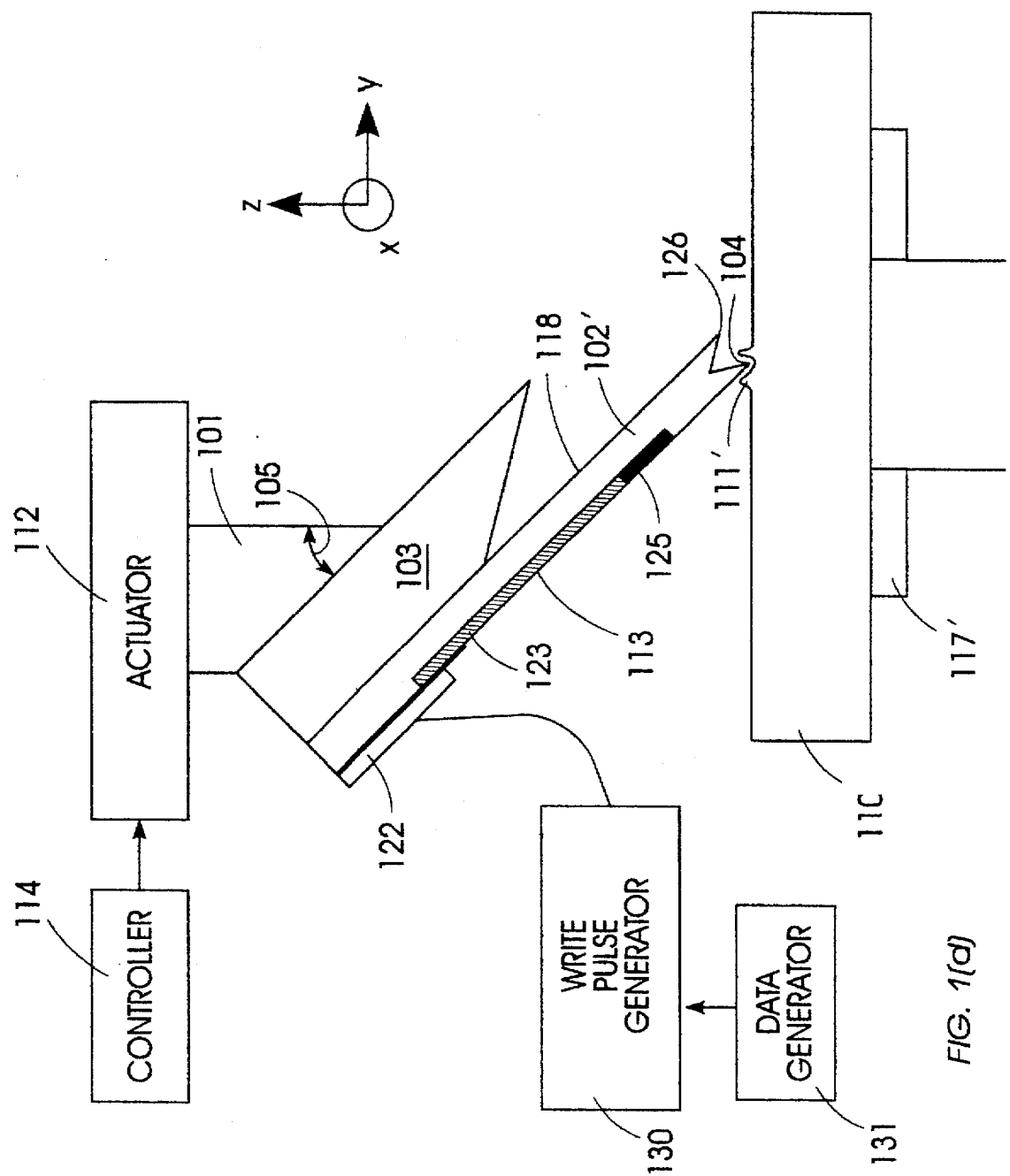
FIG. 1(d) is a block diagram of the AFM system of the present invention for use as a data recording system wherein the cantilever tip is resistively heated to deform the surface of a data recording medium.

Referring now to FIG. 1(d), the AFM system with angled cantilever having an integral in-plane tip is shown for use in recording data in a thermomechanical data recording system. The sample 110' in this case is a data storage medium with a deformable surface sensitive to heat and the cantilever tip 104 is heated by resistive heating, in the manner as described in the previously-cited Chui et al. article. The medium 110' may be a polycarbonate disk and the sample holder 117' a support that attaches the disk to a spindle motor (not shown). The spindle motor rotates the disk about the Z-axis. The cantilever 102' is essentially identical to the cantilever 102 of FIG. 1(a) except that region 123 is a highly-doped boron region extending the length of the cantilever, and region 125 is a lightly-doped boron region which forms a resistive heater near the tip 104. Electrical current from write pulse generator 130 is directed into regions 123 end 125. This creates a heated tip 104, due to resistive heating in region 125, that causes localized deformation of the medium 110', as shown by depression 111' that represents a data bit. The data generator 131 provides the digital input of 1's and 0's that are used to trigger the write pulse generator 130 to write a given data sequence. Although it is not shown in FIG. 1(d), it is understood that some sensing scheme is also used to monitor cantilever deflection and generate a control signal which is fed into actuator 112. In principle, the control scheme may be the piezoresistive sensor described in FIG. 1(a). In that case, separate electrical current paths are defined for the heater and the piezoresistor. While the resistive heating method to heat the cantilever tip is shown in FIG. 1(d), the AFM system of the present invention is also applicable with the thermomechanical data storage system and method described in the previously-cited '372 patent, where heating of the cantilever by other methods is described, such as by directing a laser beam to heat the tip.

Figure 1E:
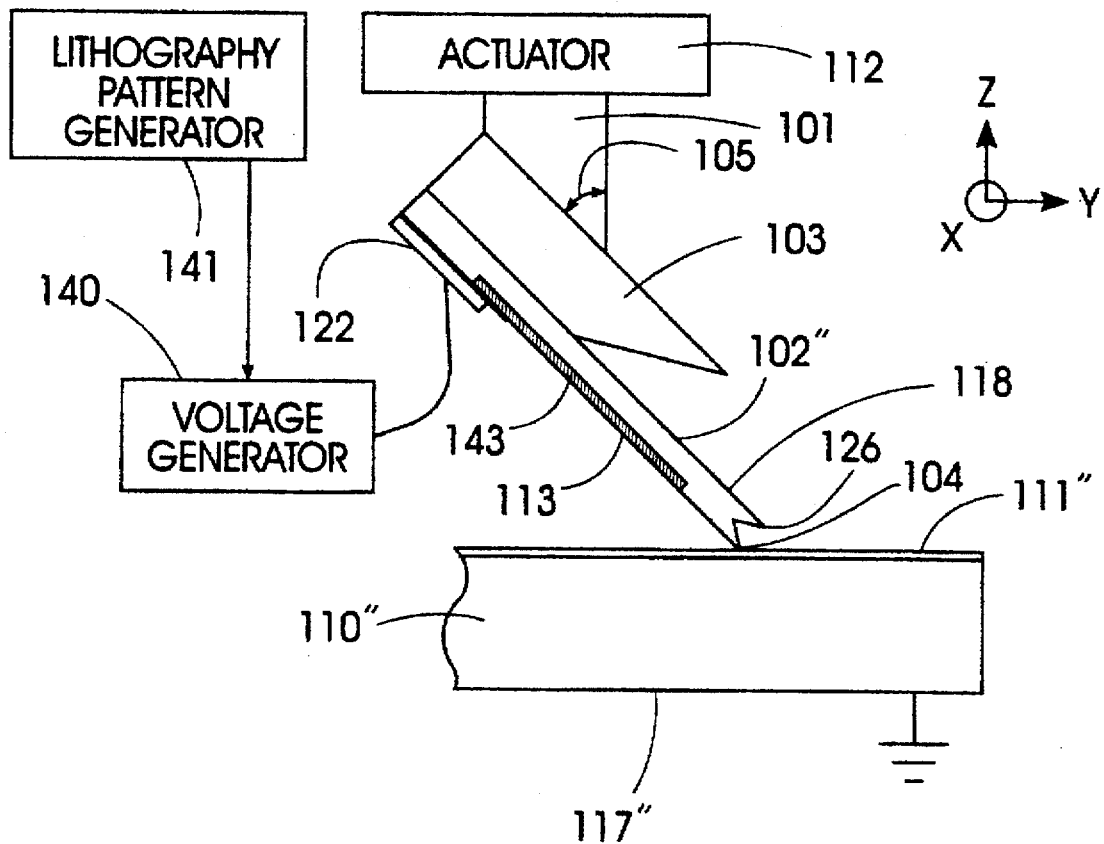
FIG. 1(e) is a block diagram of the AFM system of the present invention for use in scanning probe lithography wherein the cantilever tip is in contact with the semiconductor sample surface to facilitate an electrochemical-mechanical reaction on the surface.

Referring now to FIG. 1(e), the AFM system with angled cantilever having an integral in-plane tip is shown for use in scanning probe lithography (SPL). In SPL, an AFM system is used to fabricate electronic devices by direct writing to perform lithography. The sample 110" is a semiconductor device with a surface 111". The cantilever 102" is identical to the cantilever 102 of FIG. 1(a) except that region 143 is boron doped along the entire length of cantilever 102" to provide an electrically-conductive path. The sample 110" is held in sample holder 117" and grounded. A voltage generator 140 is connected to region 143 of cantilever 102". The voltage generator 140 thus can create an electric field between the tip 104 and the semiconductor surface 111". The electric field induces an electrochemical reaction on the surface of the sample, as described in the previously-cited Minne et al. and Majumdar et al. articles. The lithography pattern generator 141 acts to control the voltage generator 140 so that when the tip 104 is over a portion of the sample where writing is to occur, the voltage is applied to the tip so as to cause the desired electrochemical reaction. Typically, this is done by raster scanning the tip 104 and feeding a control pulse into the voltage generator 140, which is set to output the desired voltage level when it receives a control input. It is understood that some sensing scheme is also used to monitor cantilever deflection and generate a control signal which is fed into the actuator 112. In principle, this sensing scheme may be the piezoresistive technique described with respect to FIG. 1(a).

It is understood that alternative embodiments or combinations of embodiments are possible. For example, the doping may be performed using an n-type rather than a p-type dopant. In addition, the AFM cantilever with an integral in-plane tip can also be used in arrays of cantilever devices. One potential problem with arrays is that if there are variations in cantilever length or out-of-plane bending, then the tips may not all contact the surface of the sample at the same time. For sufficiently soft cantilevers, this may not be a problem as the cantilevers may be pressed into the surface until all tips are brought into contact without giving rise to an unacceptably high loading force. Alternatively, the relative position of tips in an array may be adjusted by electrostatic actuation, thermal expansion actuation, or magnetic actuation. The cantilevers of an array may also be made deliberately to have different lengths, with those closest to the corner of the support chip being the shortest. This relaxes the constraint on how accurately the support chip must be aligned to the sample in order to get all tips touching simultaneously.

Detailed Description of the Cantilever with an In-plane Tip

Figure 2A:
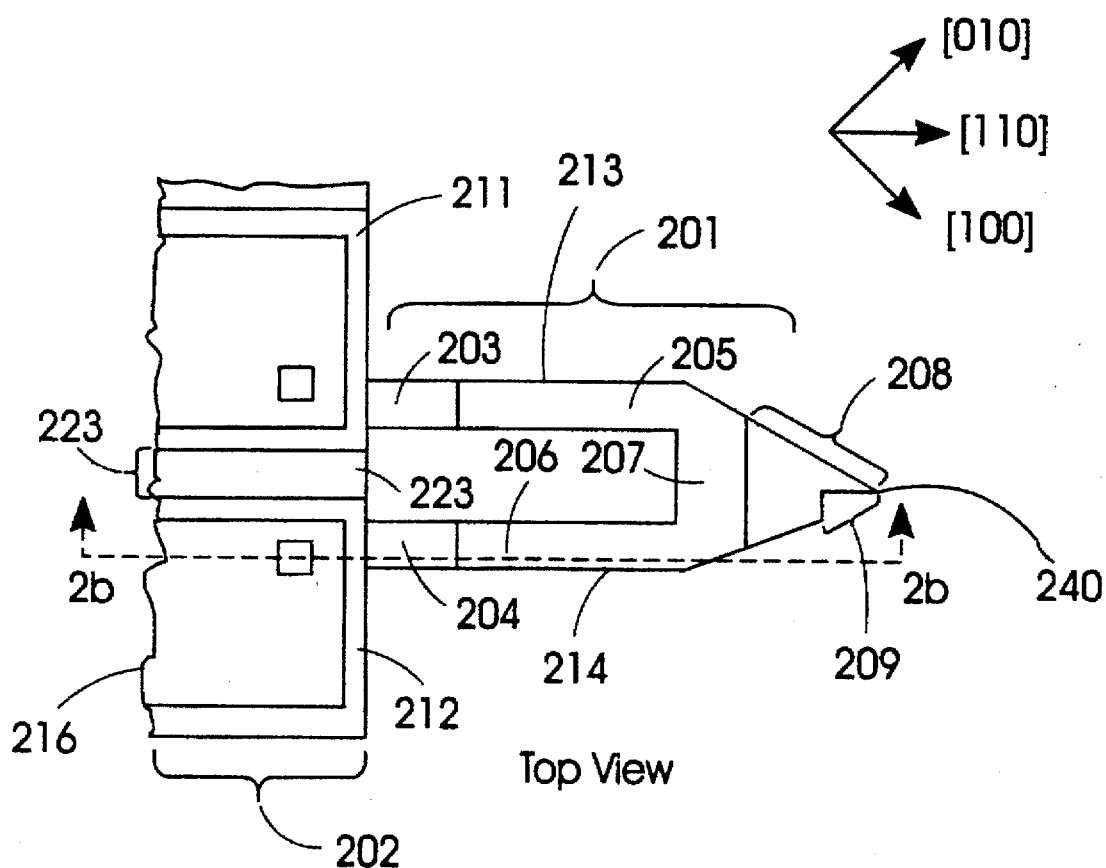
FIG. 2(a) is a top view of the preferred embodiment of the cantilever and base according to the present invention.

FIG. 2(a) depicts the layout of a first preferred embodiment of a microminiature cantilever with an in-plane tip.

Figure 2B:
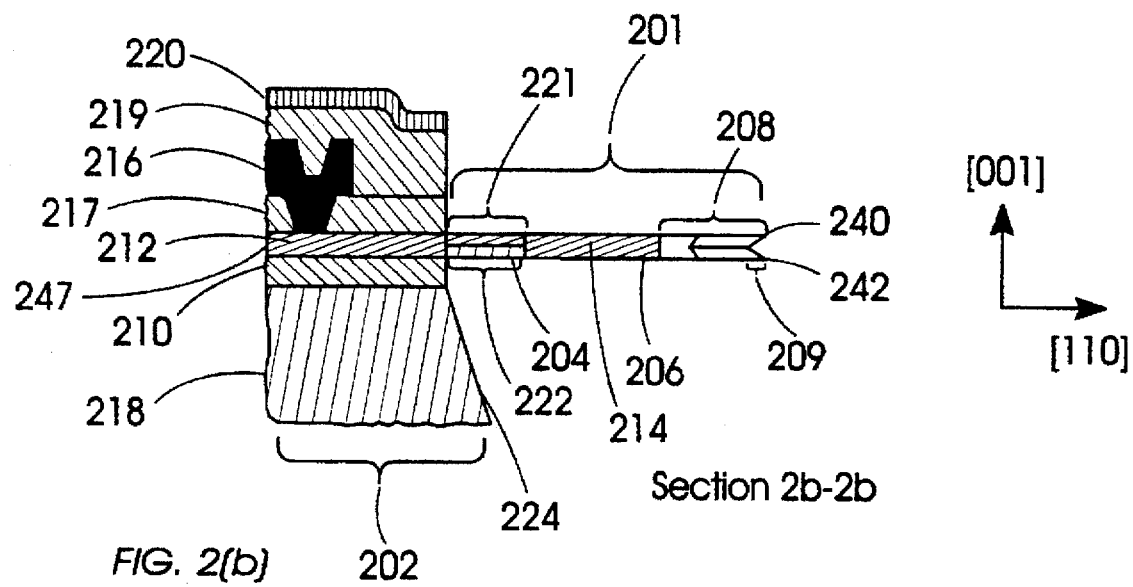
FIG. 2(b) is a side sectional view of the cantilever and base of FIG. 2(a).

FIG. 2(b) shows a cross-sectional view taken through section 2b—2b of FIG. 2(a). The cantilever 201 is connected at one end to a base 202. The base 202 is a portion of a semiconductor substrate. As shown in FIG. 2(a), the cantilever 201 is a U-shaped structure having legs 213 and 214 with connecting region 207. Tip region 208 with the scanning tip 240 is at the free end of cantilever 201. The cantilever 201 is formed from a single-crystal silicon sheet 247 with crystallographic orientation as shown in FIG. 2(b). The long axes of legs 213 and 214 are oriented in the [1 1 0] direction and lie in a (001) plane. Cantilever legs 213 and 214 have respective piezoresistive sections 203 and 204 near base 202. As in the prior art, the piezoresistive sections 203 and 204 are formed by implanting boron and annealing. This creates a greater doping density in the upper region 221 than in the lower region 222, as shown in FIG. 2(b). It should be apparent by comparing FIG. 2(b) with FIG. 1(a) that scanning tip 240 is located on the "top" surface of cantilever 201, which corresponds to surface 113 in FIG. 1(a). Thus, the combined base 202 and cantilever 201 is mounted "upside down" when located within the AFM system of FIG. 1(a).

Referring to FIG. 2(a), unlike the prior art, cantilever 201 has p+ type regions 205, 206, and 207. Regions 205, 206, and 207 are doped with boron to a greater concentration (e.g., a concentration of 2E20/cm$^2$) than piezoresistive regions 203 and 204 so that the summed series electrical resistance of sections 205, 206, and 207 is much less than the resistance of 203 and 204.

Piezoresistive sections 203 and 204 are located adjacent to base 202 to maximize the change in resistance through the cantilever 201 for a given deflection of scanning tip 240 in the [0 0 1] direction (see FIG. 2(b)). The region 208 is not so heavily doped with boron that there is a boron-etch stop during the wet anisotropic etching in the formation of the tip structure 209.

Piezoresistive sections 203 and 204 are attached to respective silicon regions 211 and 212 on base 202. Silicon regions 211 and 212 and cantilever 201 are all formed from a single sheet of single-crystal silicon 247. Silicon regions 211 and 212 are heavily-doped p+ regions (e.g., concentration of 2E20/cm$^2$) so as to have small electrical resistances relative to the cantilever 201. Silicon regions 211 and 212 are attached to a lower layer of silicon dioxide 210 on base 202 (FIG. 2(b)). Silicon dioxide layer 210 is attached to a portion of a single-crystal silicon wafer 218, which forms the major part of the base 202. The crystallographic orientation of the silicon wafer portion 218 is the same as that of the sheet of silicon 247 forming cantilever 201.

Referring to FIG. 2(b), which shows only leg 214 but not leg 213 of cantilever 201, silicon region 212 is covered with an electrically-insulating layer of low-pressure chemical vapor deposition (LPCVD), low-temperature silicon dioxide (LTO) 217. Metal connection 216 is on LTO layer 217. As shown, the metal connection 216 contacts silicon region 212 through openings in the LTO layer 217. Metal connection 216 is covered by a passivating layer of LPCVD phosphosilicate glass (PSG) 219. PSG layer 219 is covered by a layer of plasma-enhanced chemical vapor deposition (PECVD) silicon nitride 220. The leg 213 and its region 211, not shown in FIG. 2(b), have corresponding portions identical to that of leg 214.

As shown in FIG. 2(a), the silicon between silicon regions 211 and 212 has been removed to form an electrically-insulating region 223. Region 223 includes a portion of covering layer silicon nitride 220, a portion of PSG layer 219, a portion of an LTO layer 217, and a portion of a lower layer of oxide 210, all formed on top of the silicon wafer portion 218. Edge 224 of the silicon wafer portion 218 (FIG. 2(b)), which is directly underneath cantilever 201, is defined by the (1 1 1) crystallographic plane of the silicon.

Figure 2C:
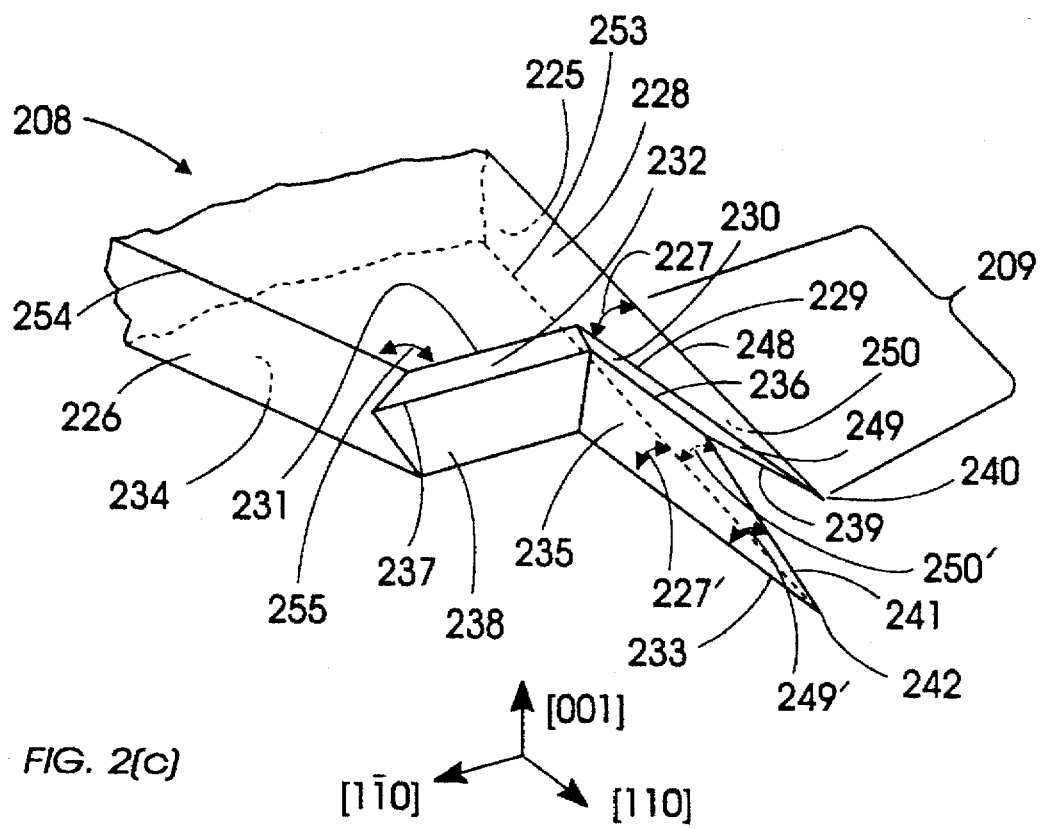
FIG. 2(c) is a perspective view of the tip region of the cantilever of FIG. 2(a).
Figure 2D:
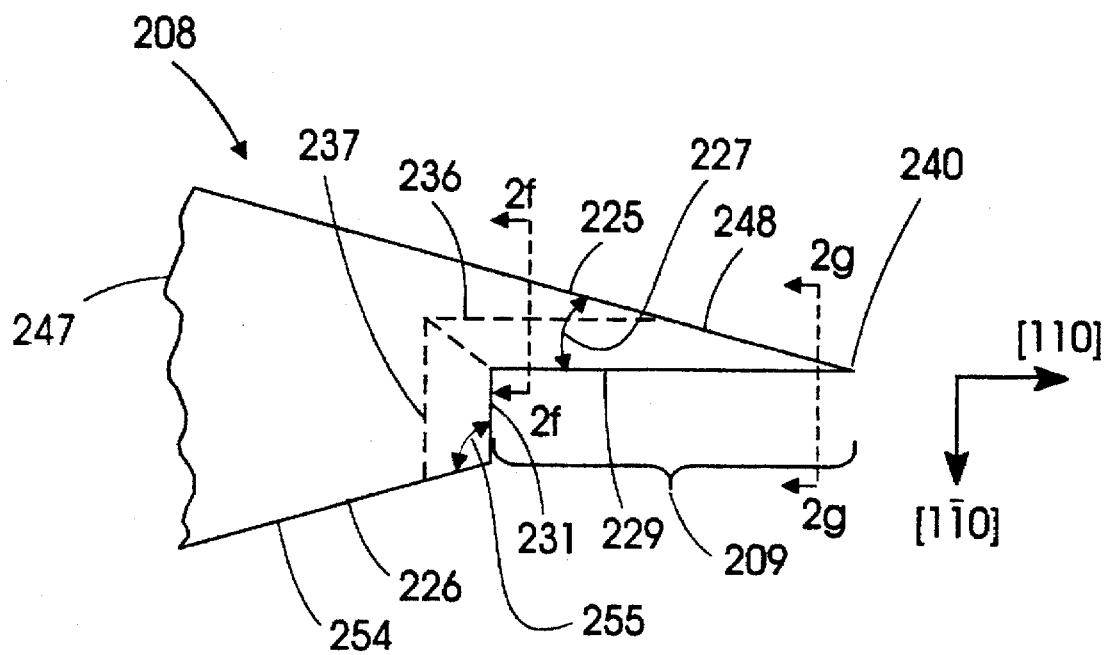
FIG. 2(d) is a top view of the tip region shown in the perspective view of FIG. 2(c).
Figure 2E:
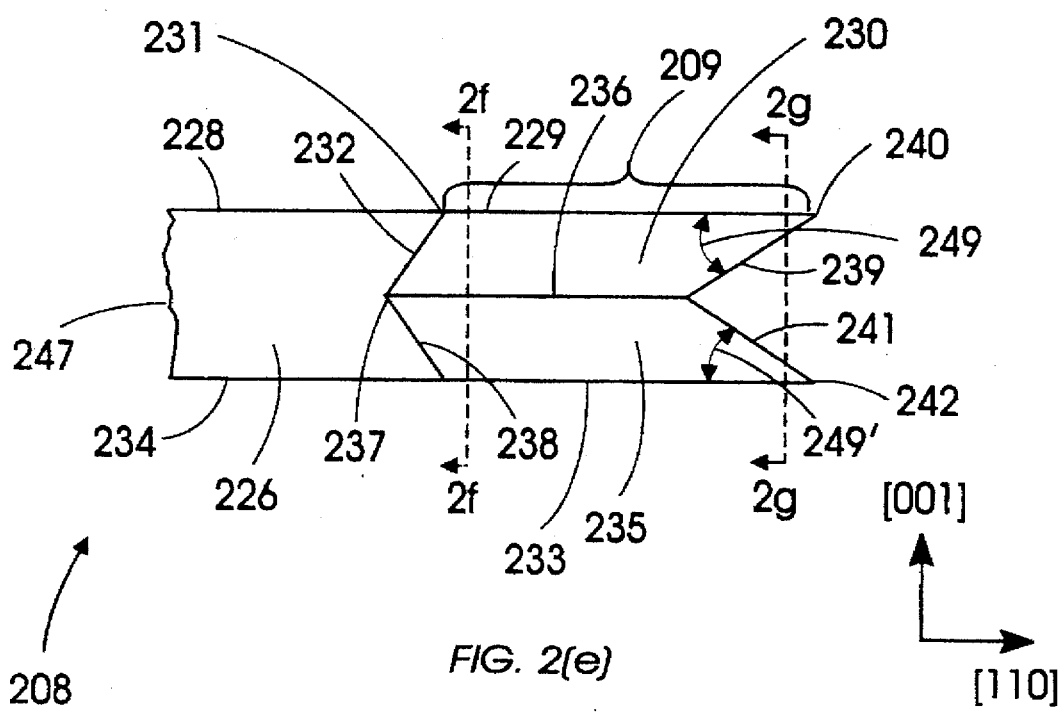
FIG. 2(e) is a side view of the tip region shown in the perspective view of FIG. 2(c).

FIG. 2(c) is a perspective view of tip region 208, FIG. 2(d) is a top view of tip region 208, and FIG. 2(e) is a side view of tip region 208.

Figure 2F:
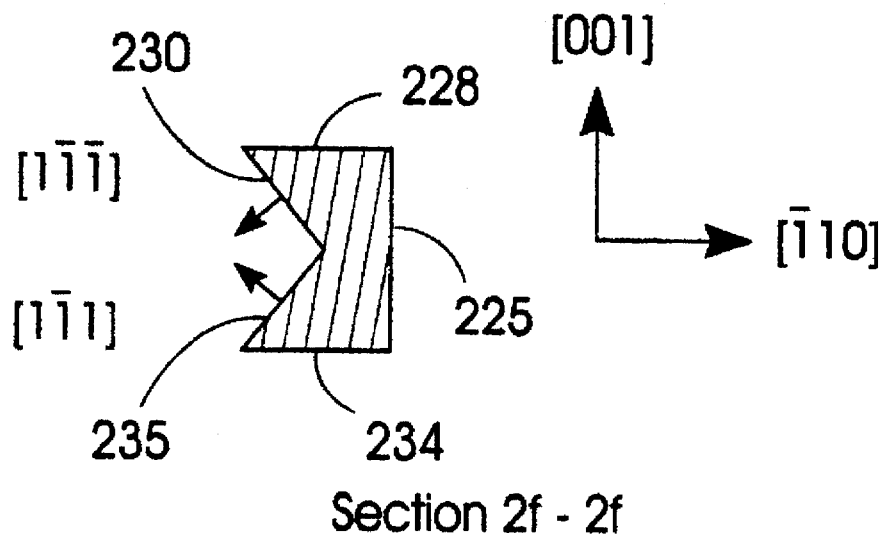
FIG. 2(f) is a sectional view of the section 2f—2f of FIGS. 2(d) and 2(e).
Figure 2G:
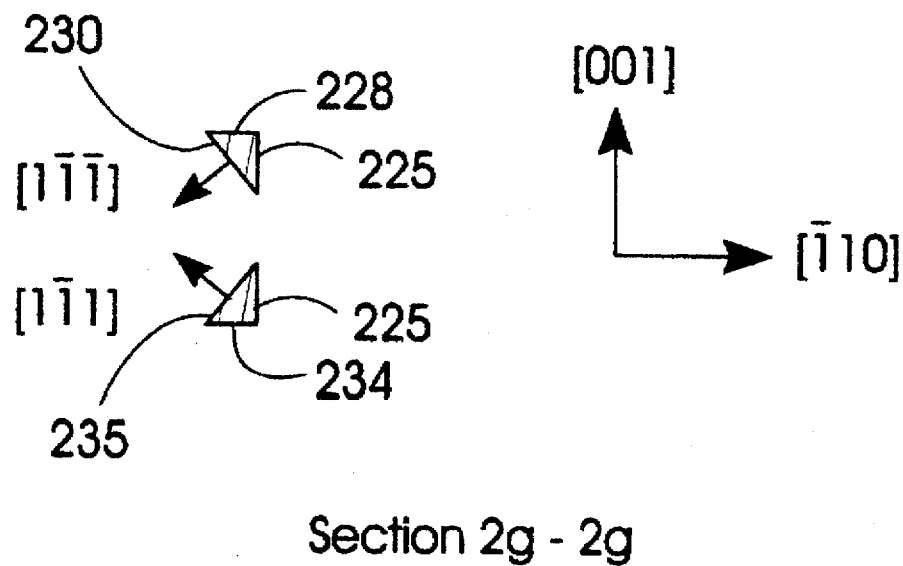
FIG. 2(g) is a sectional view of the section 2g—2g of FIGS. 2(d) and 2(e).

FIG. 2(f) is a cross-sectional view of tip structure 209 taken through section 2f—2f of FIGS. 2(d) and 2(e), and FIG. 2(g) is a cross-sectional view of tip structure 209 taken through section 2g—2g of FIGS. 2(d) and 2(e).

Tip 240 is the tip intended for sensing applications. Tip 242 results as an artifact of the fabrication process. Tip 240 is at the intersection of three planar surfaces: 228, 230, and 225 (not directly visible in FIG. 2(c)). Surface 228 is the upper (0 0 1) surface of single-crystal silicon sheet 247. Surface 230 is a portion of a (1 $\bar{1}$ $\bar{1}$) crystallographic plane. Face 225 is a planar surface that is normal to upper surface 228. This is shown in FIGS. 2(f) and 2(g).

Edge 229 lies at the intersection of surfaces 228 and 230 along the [1 1 0] crystallographic direction. Edge 239 lies at the intersection of surfaces 225 end 230. Edge 248 lies at the intersection of surfaces 225 and 228. Tip 240 is at the intersection of edges 229, 239, and 248.

As shown in FIGS. 2(c) and 2(d), edges 248 and 229 form an angle 227 with respect to each other in plane 228. Thus, edge 248 forms an angle 227 with respect to the [$\bar{1}$ $\bar{1}$ 0] crystallographic direction. Angle 227 is set to a desired value by photolithographic patterning. Typically, the magnitude of angle 227 is small enough so that the tip 240 can probe small dimensions, but large enough to give adequate mechanical support to tip 240 (e.g., angle 227 may have a value of approximately 15°).

Edge 239 forms an angle 249 with respect to edge 229. Edge 239 forms an angle 250 with respect to edge 248 in face 225. Angles 249 and 250 are uniquely determined by angle 227 and by the silicon crystallographic planes. The magnitude of angle 249 is given by arctan [√3 tan (angle 227)]. The magnitude of angle 250 is given by arctan [√2 sin (angle 227)].

The planar surfaces forming tip 242 are essentially a mirror image of those forming tip 240. Like tip 240, tip 242 is at the intersection of three planar surfaces: 234, 235, and 225. Surface 234 is the lower (0 0 $\bar{1}$) surface of single-crystal silicon sheet 247. Surface 235 is a portion of a (1 $\bar{1}$ 1) crystallographic plane. Edge 233 lies at the intersection of surfaces 234 and 235. Edge 241 lies at the intersection of surfaces 225 and 235. Edge 253 lies at the intersection of surfaces 225 and 234. Tip 242 is thus at the intersection of edges 233, 241, and 253. Edge 233 lies along the [1 1 0] crystallographic direction. As shown in FIG. 2(c), edge 253 forms an angle 227' (identical to angle 227) with respect to edge 233. Edge 241 forms an angle 249' with respect to edge 233, and an angle 250' with respect to edge 253. Angles 250' and 249' are uniquely determined by angle 227 and by the silicon crystallographic planes. The magnitude of angle 249' is identical to that of 249, and the magnitude of angle 250' is identical to that of angle 250.

Edge 231 is formed by the intersection of (1 1 $\bar{1}$) surface 232 and upper surface plane 228. Line segment 236' is defined by the intersection of surfaces 230 and 235. Line segment 237 is defined by the intersection of surface 232 and (1 1 1) surface 238. Face 226 is a planar surface that is normal to upper surface 228.

Edge 254 lies at the intersection of surfaces 228 and 226. As shown in FIGS. 2(c) and 2(d), edge 254 forms an angle 255 with edge 231. The magnitude of angle 255 is chosen to enable tip 240 to probe small dimensions while allowing adequate mechanical support (e.g., angle 255 may have a value of approximately 120°).

Process for Fabricating the Cantilever with an In-plane Tip

The process for manufacturing the cantilever 201 and base 202 of FIGS. 2(a)–2(g) will be described with respect to FIGS. 3(a)–3(n).

Figure 3A:
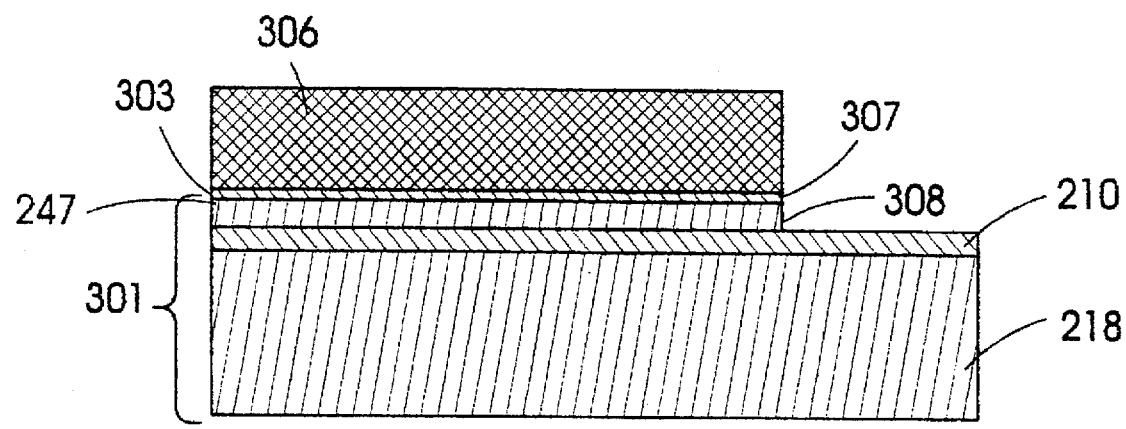
FIGS. 3(a)–3(n) are views illustrating steps in the fabrication of the preferred embodiment of the cantilever and base shown in FIGS. 2(a)–2(g).

The starting material is a silicon-on-insulator (SOI) substrate 301 (FIG. 3(a)). The substrate 301 comprises a <100> n-type phosphorus-doped, 10–20 Ohm-cm silicon wafer 218 with a covering layer of silicon dioxide 210 and a surface layer of single-crystal silicon 247 over the layer 210. The silicon dioxide layer 210 is about 400 nm thick. The surface silicon layer 247 has a thickness of about 340 nm and the same doping and crystallographic orientation as the wafer 218. Cantilever 201 will be formed from silicon layer 247 (FIG. 2(a)). The first step is to grow a 20 nm thick layer of silicon dioxide 303 on silicon layer 247 by putting the substrate 301 into an oxygen atmosphere at elevated temperature. The thin oxide layer 303 protects the surface of silicon layer 247 during subsequent processing steps. Next, a layer of photoresist 306 is applied to the upper surface of silicon dioxide layer 303. The photoresist is lithographically patterned to define regions of silicon dioxide layer 303 and silicon layer 247, which will be removed.

Figure 3B:
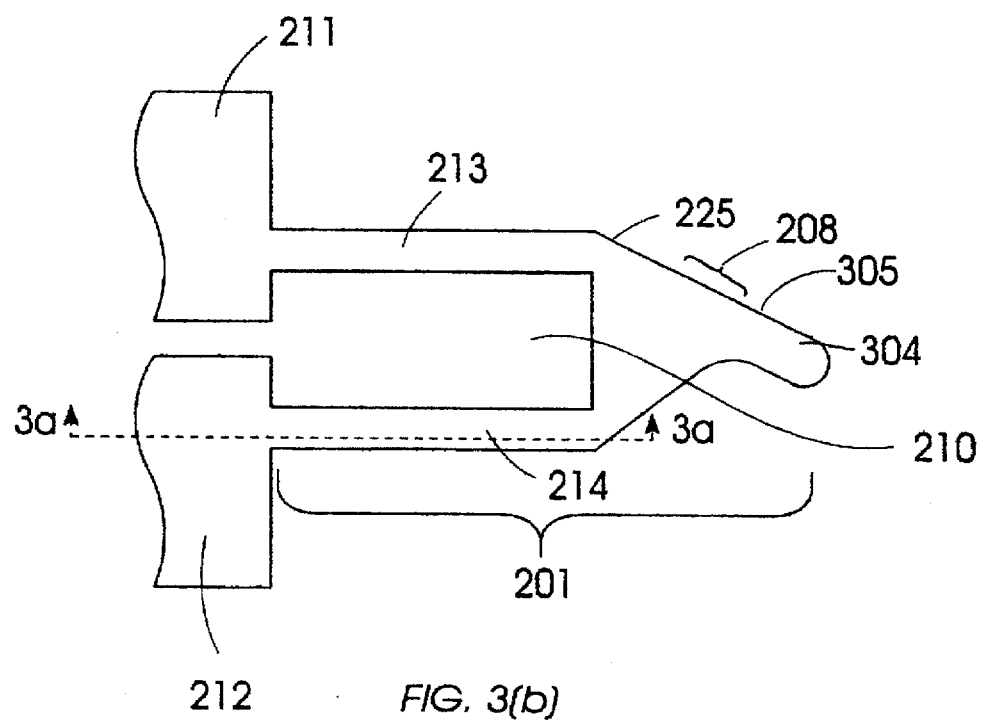
FIG. 3(o) is a view illustrating a first variation of the preferred embodiment of the cantilever in the region near the attachment of the cantilever to the base.
FIG. 3(p) is a view illustrating a second variation of the preferred embodiment of the cantilever in the region near the attachment of the cantilever to the base.
FIG. 3(q) is a top view illustrating a third variation of the preferred embodiment of the cantilever.
FIG. 3(r) is a top view illustrating a fourth variation of the preferred embodiment of the cantilever.

The edges of the photoresist 306 define the cantilever 201 and the silicon regions 211 and 212, which will form part of the base as shown in FIG. 3(b). In the tip region 208, the face 225 is patterned using an edge of the photoresist 306. Location 305 corresponds to where tip 240 will later be formed. Due to the finite radius of curvature that can be obtained at. photolithographically-defined corners, face 225 is patterned as shown to extend beyond location 305 into region 304. The cross-sectional view of FIG. 3(a) is taken through section 3a–3a of FIG. 3(b).

As shown in FIG. 3(a), an anisotropic plasma etch is used to remove exposed regions of silicon dioxide layer 303 and to leave a nearly vertical sidewall 307 at the edge. Similarly, an anisotropic plasma etch is used to remove exposed regions of silicon layer 247 and to leave a nearly vertical sidewall 308 at the edge. Next, the photoresist 306 is removed using conventional techniques.

Figure 3C:
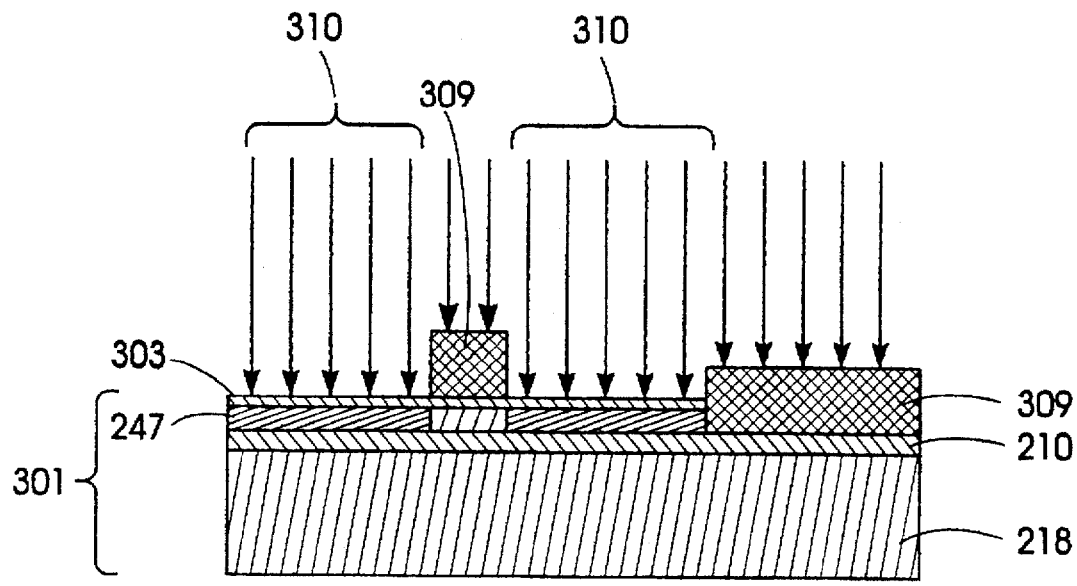

Referring to FIG. 3(c), which depicts a cross-sectional view in the same location as that of FIG. 3(a), new photoresist 309 is applied and lithographically patterned to expose regions 310. Next, the substrate 301 with photoresist 309 is implanted with boron through thin oxide layer 303 from the front side so that silicon layer 247 becomes heavily doped in the exposed regions 310 (e.g., with energy 20 keV, dose 2E15/cm$^2$ and energy 70 keV, dose 4E15/cm$^2$). The regions 310 of FIG. 3(c) correspond to doped regions 205, 206, 207, 211, and 212 of FIG. 2(a). Next, the photoresist 309 is removed using conventional techniques.

Figure 3D:
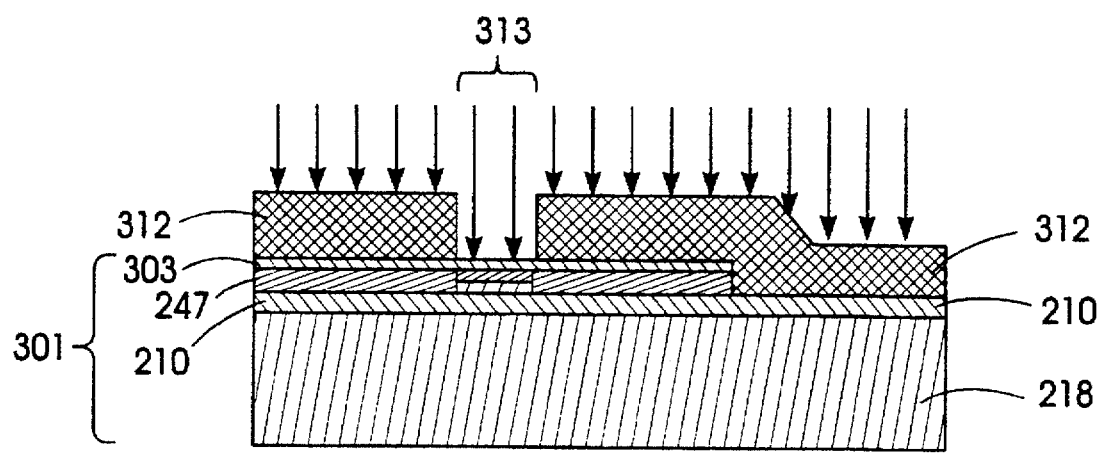

Referring to FIG. 3(d), which depicts a cross-sectional view in the same location as that of FIG. 3(a), new photoresist 312 is applied and lithographically patterned to expose regions 313. Next, the substrate 301 with photoresist 312 is implanted with boron from the front side so that in the exposed regions 313, the silicon layer 247 becomes doped in the upper surface region to an extent suitable for a piezoresistor (e.g., with energy 10 keV, dose 6E13/cm$^2$). This region becomes piezoresistive region 204 (FIG. 2(b)). Exposed regions 313 correspond to piezoresistors 203 and 204 of FIG. 2(a). The photoresist 312 is then removed using conventional techniques.

Figure 3E:
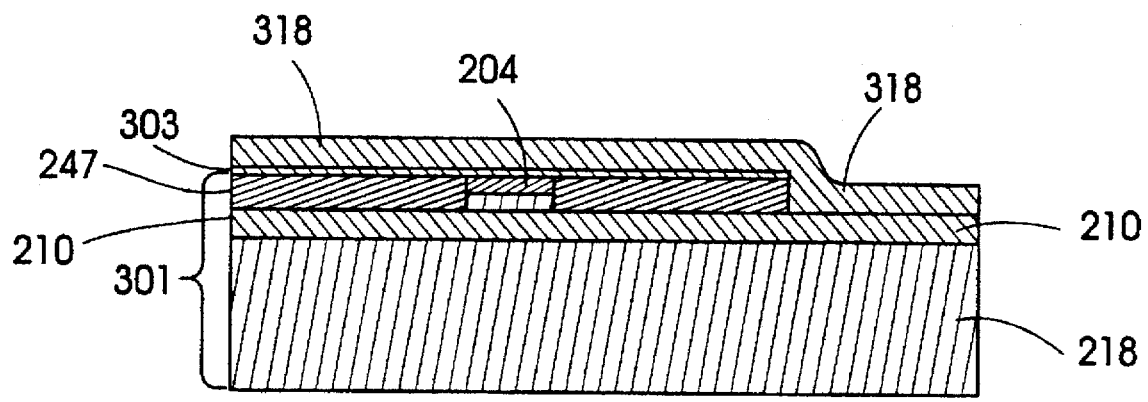

Referring to FIG. 3(e), which depicts a cross-sectional view in the same location as that of FIG. 3(a), a 400 nm thick layer of low-temperature oxide (LTO) 318 is deposited over the wafer. Subsequently, the substrate is subjected to a rapid thermal anneal (e.g., 10 seconds at 1050° C. in a nitrogen ambient atmosphere) to increase the density of the LTO 318 and to activate the implanted boron without appreciable diffusion. Diffusion of the boron must be limited to preserve the shallow doping depth of the piezoresistive region 204.

Figure 3F:
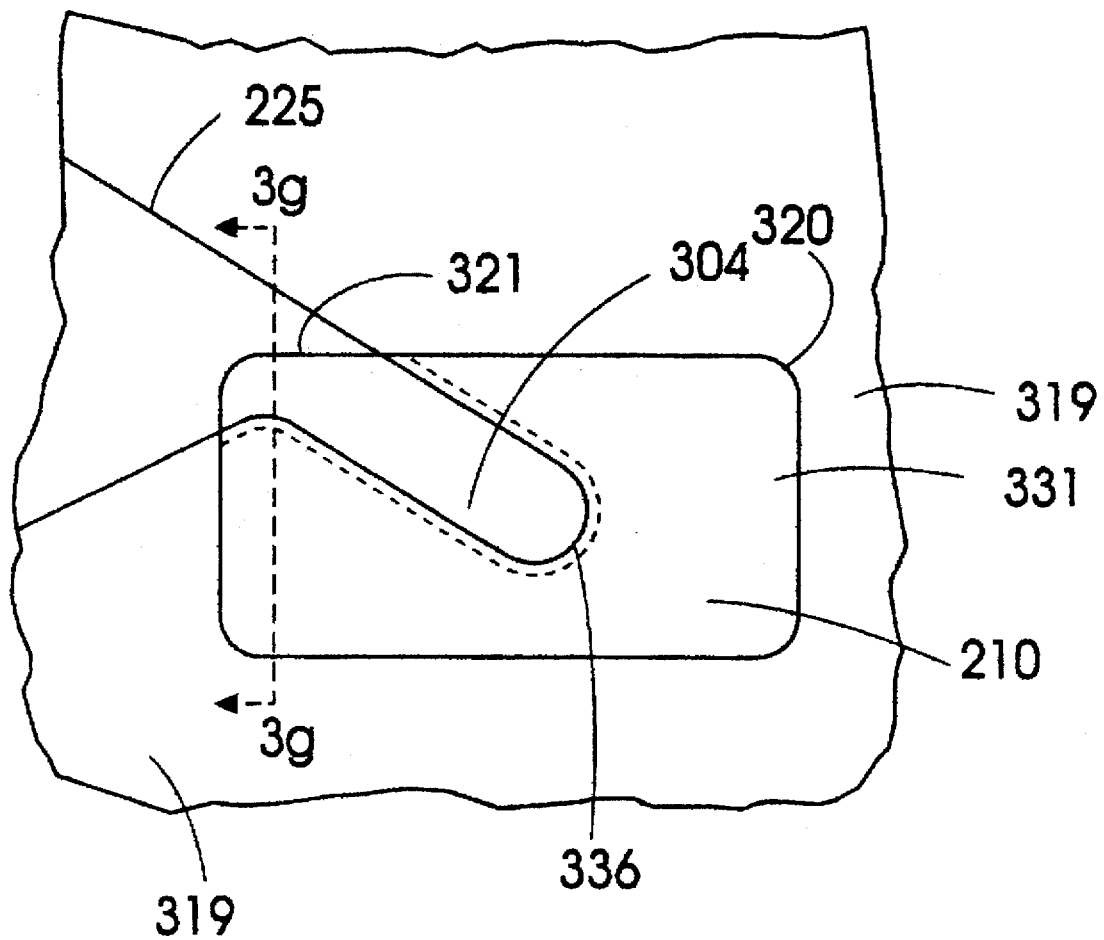
Figure 3G:
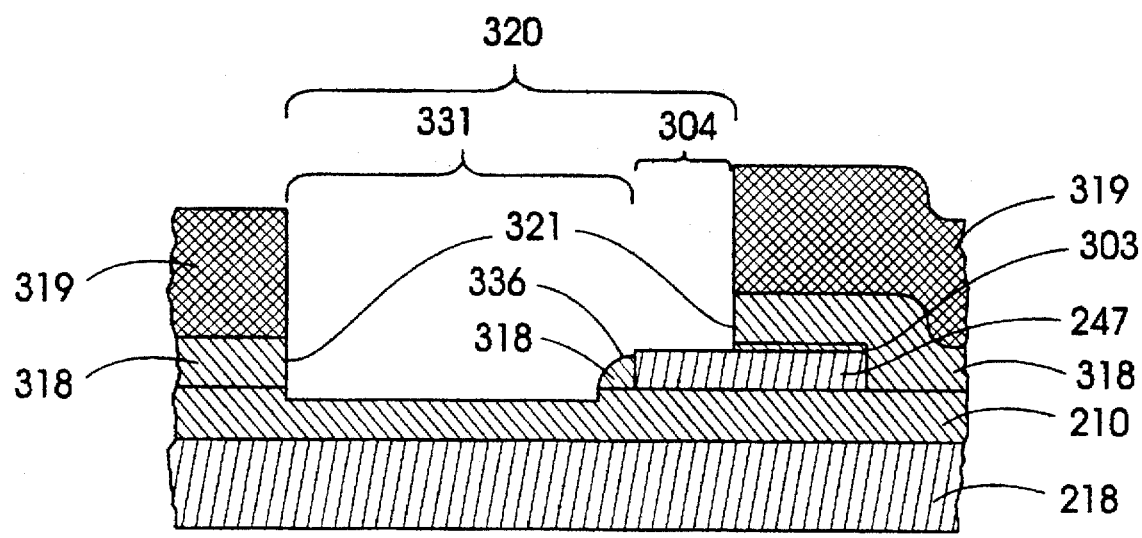

Referring to FIG. 3(f), which shows a top view of the tip region 208, and to FIG. 3(g), which shows a cross-sectional view along line 3g—3g of FIG. 3(f), photoresist 319 is applied and lithographically patterned to expose region 320 for the formation of the cantilever tip. Open region 320 includes region 304 of silicon layer 247. An anisotropic plasma etch is used to remove exposed regions of LTO layer 318 and silicon dioxide layer 303 and to leave a nearly vertical sidewall 321 at the edge. As shown, region 331 is that portion of region 320 in which LTO layer 318 is attached directly to oxide layer 210. The anisotropic plasma etch of LTO layer 318 is time limited so as to remove only a small fraction of the thickness of oxide layer 210 in region 331. A sidewall structure 336 composed of LTO 318 is formed around the edge of silicon region 304 as a product of the etching process.

Figure 3H:
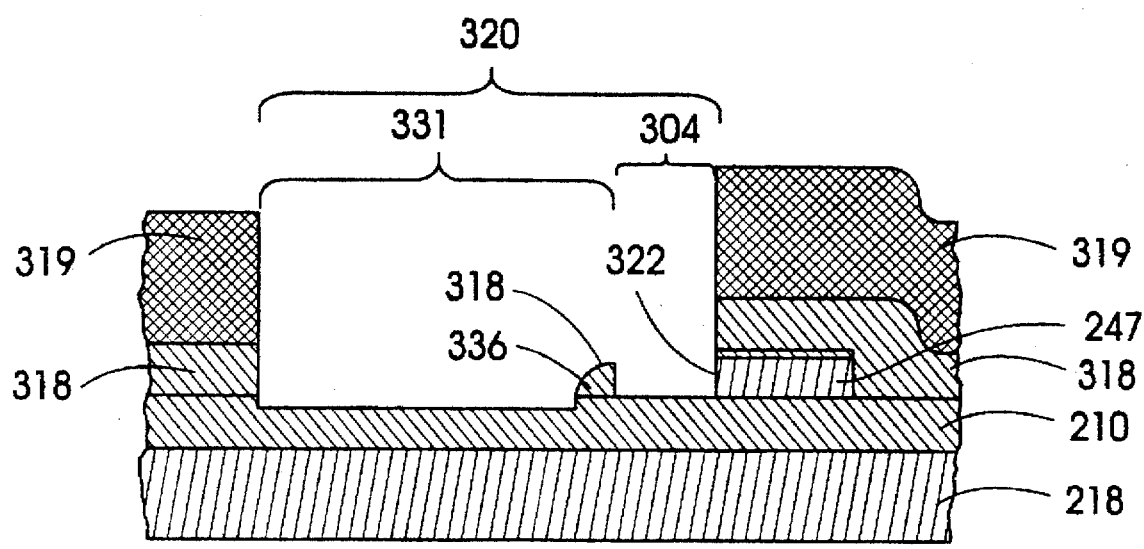

Next, referring to FIG. 3(h), which shows a cross-sectional view in the same location as FIG. 3(g), an anisotropic plasma etch is used to remove exposed region 304 of silicon layer 247 and to leave a nearly vertical sidewall 322 at the edge. (The location of region 304 is also shown in FIG. 3(b) and FIG. 3(f).) The plasma etch of silicon layer 247 is highly preferential to silicon dioxide so that only a relatively small amount of silicon dioxide 210 is removed in region 331. Next, photoresist 319 is removed using conventional techniques.

Figure 3I:
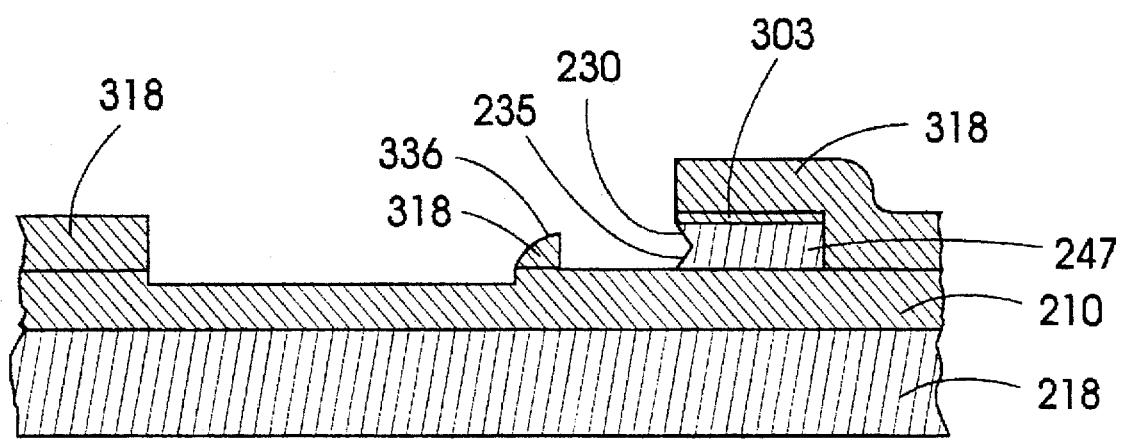

Next, referring to FIG. 3(i), which shows a cross-sectional view in the same location as FIG. 3(g), the wafer is subjected to a wet anisotropic etch which preferentially etches in the <100> directions of silicon, etches at a greatly reduced rate in the <111> directions, and etches LTO layer 318 and silicon dioxide layers 303 and 210 at a negligible rate. For example, tetramethyl ammonium hydroxide may be used to etch. The duration of this etch is such that silicon is etched at least a few thousand nm in the <100> directions. During this etch, the silicon is etched laterally on the exposed vertical silicon sidewalls 322, shown in FIG. 3(h), until etching stops on {111} planes 230 and 235, shown in FIG. 3(i) and in FIGS. 2(c), 2(e) and 2(f). This etch forms tip structure 209 shown in FIGS. 2(a)–2(g).

Figure 3J:
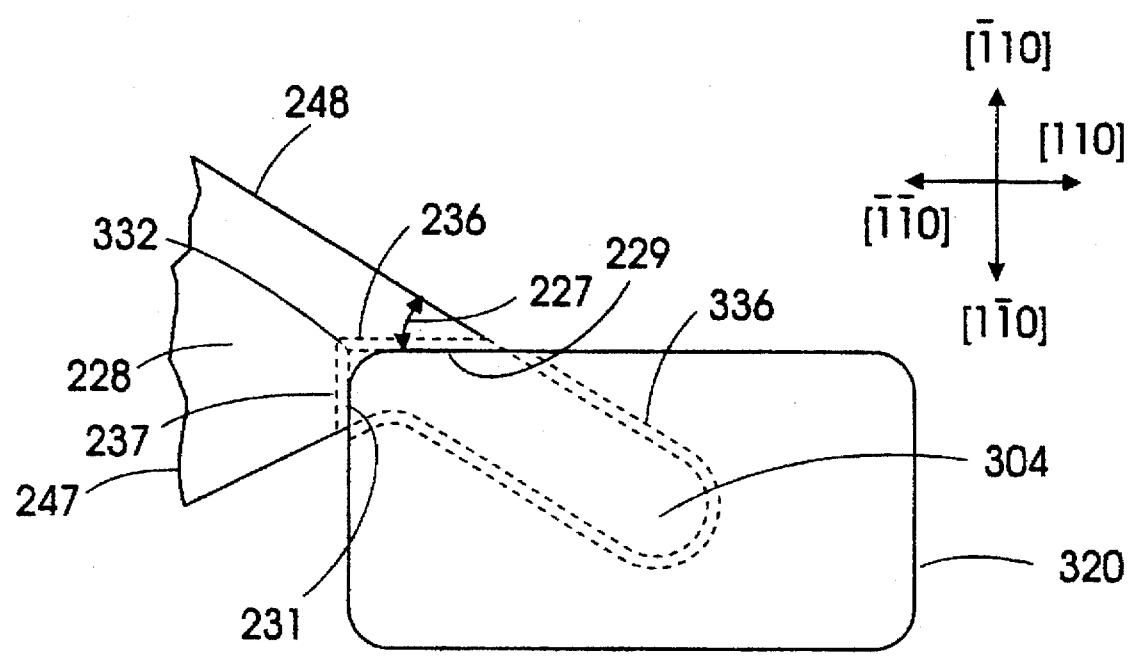

FIG. 3(j) shows a top view of tip region 208 in the same state of processing as in FIG. 3(i). The outline of removed region 304 and open region 320 have been preserved for clarity. FIG. 3(j) can be understood by also referring to FIG. 2(d). The anisotropic etch has formed edges 229 and 231 along the upper surface 228 of silicon sheet 247. Edge 229 propagates along the [$\bar{1}\bar{1}$ 0] direction and edge 231 propagates along the [$\bar{1}$ 1 0] direction so that corner 332 may be etched beyond the edge of open region 320. Line segments 236 and 237 correspond to the farthest points of lateral etching. Angle 227 is defined by the orientation of edge 248 with respect to edge 229.

Figure 3K:
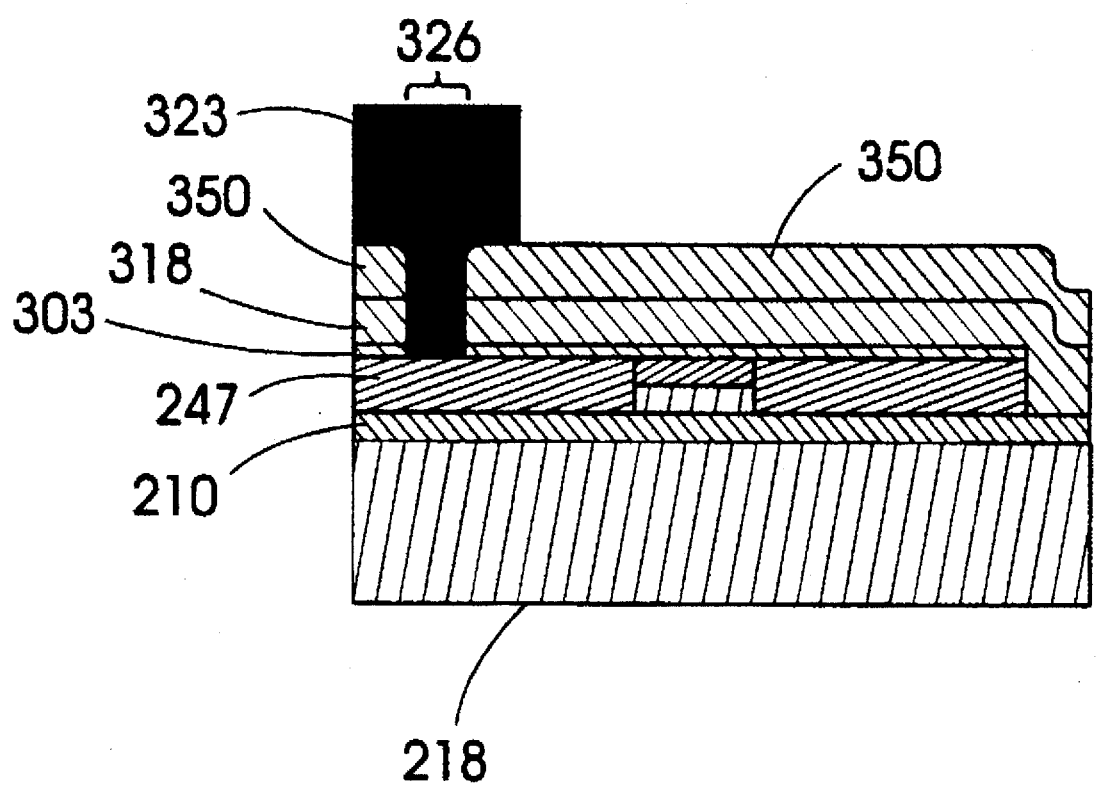
Figure 3I:
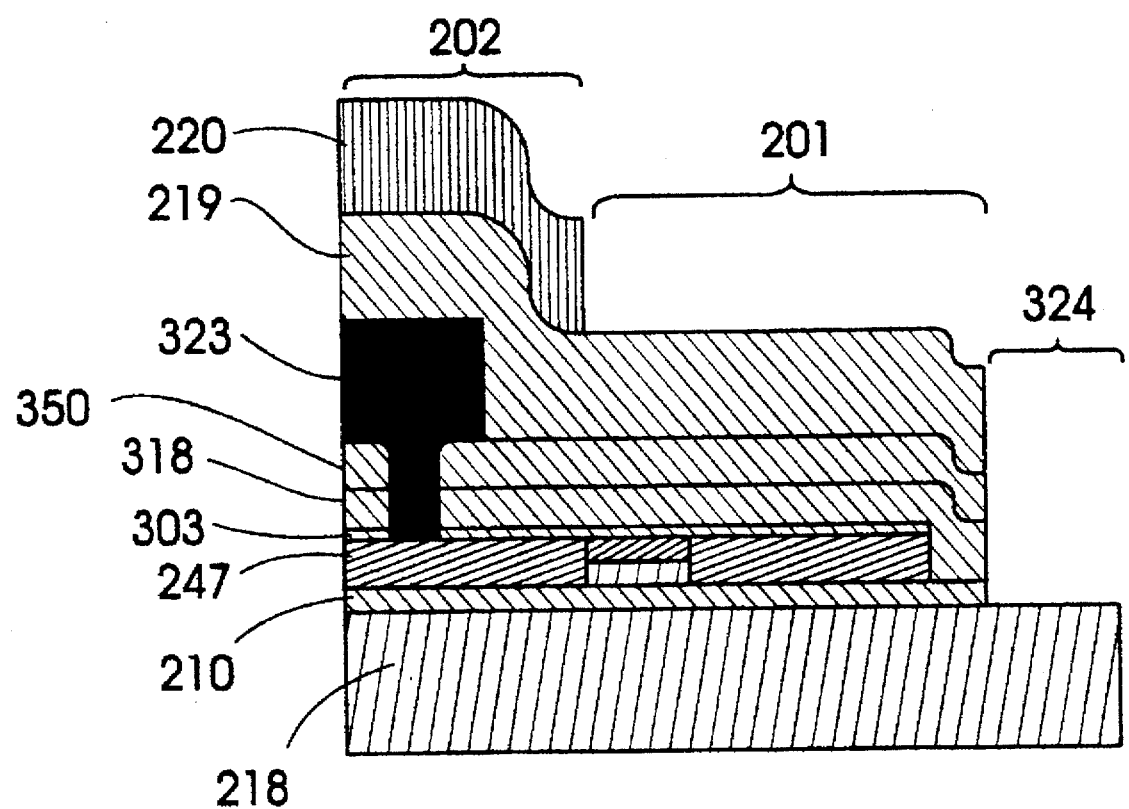
Figure 3M:
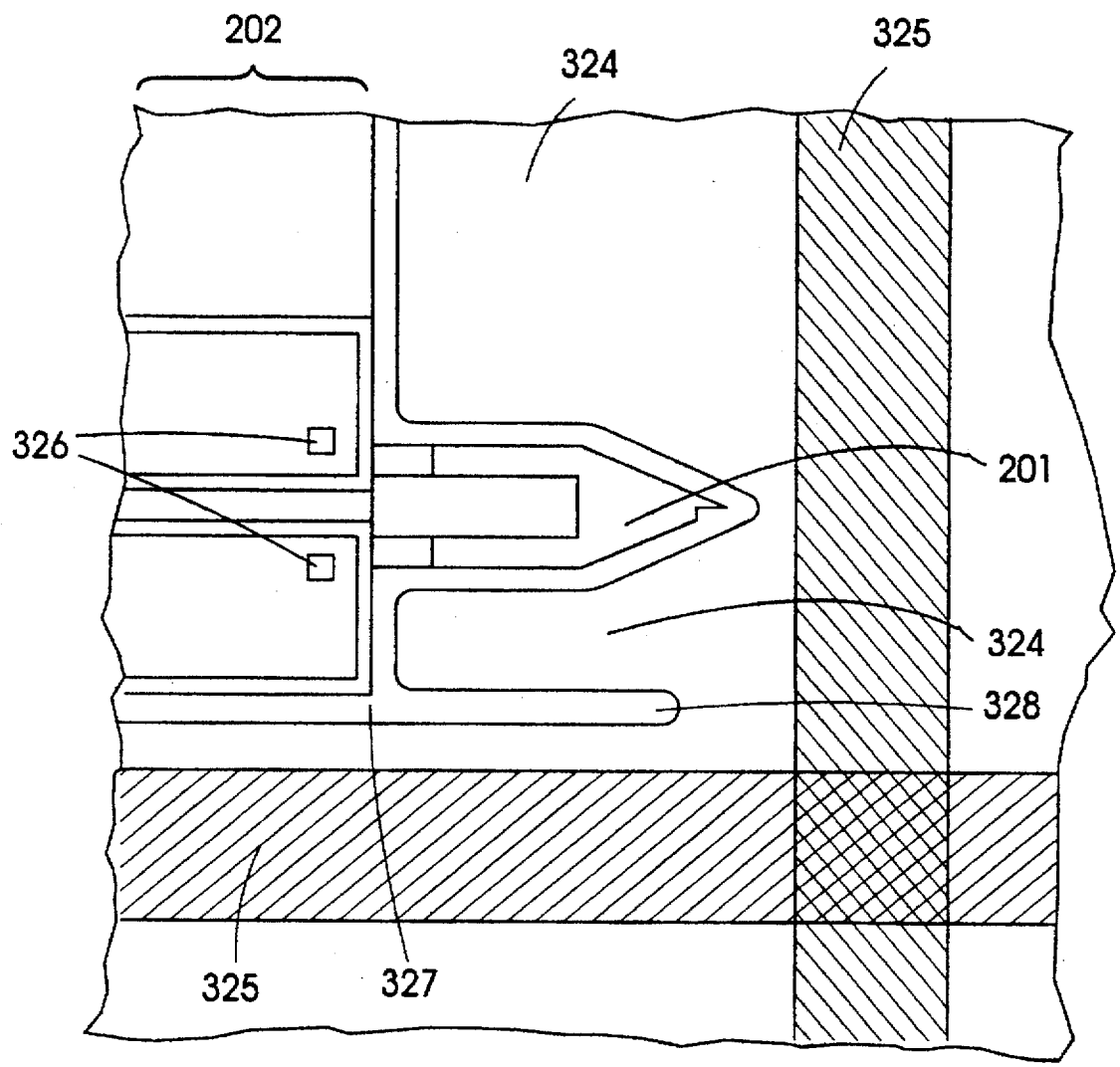

Referring next to FIG. 3(k), which shows a cross-sectional view in the same location as FIG. 3(a), the substrate 301 is coated with an encapsulating layer of LTO 350 approximately 400 nm thick. Then photoresist is applied and lithographically patterned to expose region 326 where holes will be formed in the oxide layers for forming metal contacts to silicon sheet 247. Next, an anisotropic plasma etch is used to remove the LTO 350, LTO 318, and oxide layer 303 above the silicon 247 in the exposed region 326. Next, a metal layer 323 is sputtered and patterned using standard photolithography techniques to produce metal connections to the silicon layer 247 in exposed regions 326.

Referring to FIG. 3(*l*), which shows a cross-sectional view in the same location as FIG. 3(*a*), the wafer is coated with a passivating layer of PSG 219 approximately 1000 nm thick. Then the front side of the wafer is coated with a layer of PECVD nitride 220 roughly 500 nm thick. Next, the nitride layer 220 is patterned using standard photolithography and plasma-etching techniques. The purpose of the nitride layer 220 is to act as a masking layer for the underlying PSG layer 219 and oxides in subsequent processing steps. After patterning, the nitride 220 is confined to regions which will form part of the support 202 and is removed from regions which will form part of the cantilever 201. After pattering, the nitride layer 220 has been removed over regions of the metal bonding pads (not shown in FIG. 3(*l*)) on the base 202. Next, new photoresist is applied and patterned using standard photolithography techniques to expose region 324 about cantilever 201. Next, as shown, an anisotropic plasma etch is used to remove PSG 219, LTO 350, LTO 318, and oxide layer 210 from exposed region 324.

Referring next to FIG. 3(*m*), the substrate 301 is cut with a diamond saw to a depth of roughly half of the thickness of the silicon wafer 218. The purpose of the saw cuts 325 is to facilitate the separation of the substrate 301 into individual dice. As shown, the saw cuts 325 are placed in such a way that cantilever structure 201 will be near a corner of a released dice. Next, the substrate 301 is subjected to a wet anisotropic etch which preferentially etches in the {100} directions of silicon, etches at a greatly reduced rate in the {111} directions, and which etches the oxide layer 210, PSG layer 219, and nitride layer 220 at a negligible rate. The duration of this wet anisotropic etch is such that the silicon 218 is removed beneath cantilever structure 201, resulting in the freeing of the cantilever. As shown, compensating regions 328 of the PSG layer 219, LTO layer 350, LTO layer 318, and oxide layer 210 are used to reduce the etching of silicon 218 below corner 327 of the base 202 during this wet anisotropic etching step.

As an alternative to saw cuts 325, the dicing of substrate 301 with a diamond saw may be omitted. Instead, "V" shaped grooves may be formed in wafer 218 during the final wet anisotropic etch of silicon. These grooves may then be used to fracture wafer 218 to separate the dice.

FIG. 3(*n*), which shows a cross-sectional view in the same location as FIG. 3(*a*), depicts the cantilever after silicon 218 has been removed from below the cantilever and etched back to surface 224. Next a wet etch is performed to remove the oxide layers 219, 318, 350, 210, and 303 encapsulating the silicon 247 which forms the cantilever 201. During the same etch, PSG layer 219 is removed from above the bonding pads (not shown in FIG. 3(*n*)).

The resulting shape of the cantilever and base is now as shown in FIGS. 2(*a*)–2(*g*).

Alternative Embodiments and Processes

Parameters for plasma etching of silicon can be varied to give different slopes of the sidewalls. If other than vertical sidewalls are used in the formation of sidewalls for face 225 of FIGS. 2(*c*), 2(*d*), 2(*f*) and 2(*g*) and face 322 of FIG. 3(*h*), then the relative lateral positions of tips 240 and 242 of FIGS. 2(*c*) and 2(*e*) will be shifted, and edge 236 of FIGS. 2(*c*) and 2(*e*) will be shifted up or down accordingly.

Alternate means other than silicon nitride layer 220 and PSG layer 219 may be used to passivate the surface of the base 202. One alternative passivating material is polyimide.

Referring to FIG. 3(*o*), the lithographic patterning of the component layers may be varied so that the piezoresistive regions 203 and 204 are located away from edge 224 of silicon wafer 218. This variation has the advantage of extending the cantilever 201 further away from base 202 so as to improve accessibility of tip structure 209 to the sample. In this variation, the rigidity of the laminated layers in the region 329 between the edge 224 end the piezoresistive regions 203 and 204 may be sufficient to concentrate bending stresses in the piezoresistive regions 203 and 204 in response to deflections of the tip structure 209 in the [0 0 $\bar{1}$] direction. The variation illustrated in FIG. 3(*o*) may be used in conjunction with cantilever release schemes described in the prior art in which the wafer is anisotropically etched from the back side to release cantilevers on the front side. Process variations in etching through the wafer would result in changing the size of region 329 without affecting the length of cantilever 201. An advantage of etching from the back side is the improved optical access from the bottom of the cantilever.

Referring to FIG. 3(*p*), the lithographic patterning of the component layers may be varied so that the piezoresistive regions 203 and 204 are located directly above, but not in contact with, silicon wafer 218 that is part of base 202. The resulting air gap 330 allows the application of a voltage difference between the silicon wafer 218 and the cantilever 201. The voltage difference may be used to electrostatically actuate cantilever 201 in the [0 0 $\bar{1}$] direction. Also, the voltage difference may be used to capacitively detect deflections of the cantilever 201 in the [0 0 $\bar{1}$] direction.

Referring to FIG. 3(*q*), the lithographic patterning of the component layers may be varied so that connecting region 207 forms the greater part of the length of the cantilever 201. This variation has the advantage of a larger fractional change in resistance of the cantilever because of the reduced resistances of sections 205 and 206 relative to cantilevers as shown in FIG. 2(*a*) in which legs 213 and 214 form the greater part of the length of the cantilever. This variation has the additional advantage that the width of connecting region 207 may taper down to tip region 208 in order to reduce the mass and increase the fundamental resonant frequency of cantilever 201.

Referring to FIG. 3(*r*), legs 213 and 214 may be patterned in perpendicular directions to be at generally a right angle with one another with tip 240 being located near the apex of the right angle. This variation has the advantage of improved accessibility of tip 240 at the corner of base 202.

FIG. 4(*a*) depicts in perspective view a second embodiment of a tip structure 401 for a cantilever. FIG. 4(*b*) is a top view of the tip structure 401. FIG. 4(*c*) is a side view of the tip structure 401. FIG. 4(*d*) is a view of cross-section 4*d*—4*d* of FIGS. 4(*b*) and 4(*c*). FIG. 4(*e*) is a view of cross-section 4*e*—4*e* of FIGS. 4(*b*) and 4(*c*).

Tip structure 401 is composed of a sheet of single-crystal silicon with upper surface 402 and lower surface 403. Side faces 404 and 405 are formed with conventional lithographic and anisotropic plasma-etching techniques so as to be nearly perpendicular to upper face 402 and lower face 403. As shown, face 406 is part of a (1 $\bar{1}$ 1) crystalline plane. Face 407 is part of a (1 1 1) crystalline plane. Face 408 is part of a ($\bar{1}$ 1 1) crystalline plane.

Edge 410 is formed by the intersection of planar face 404 with face 406. Edge 411 is formed by the intersection of upper surface 402 with face 406. Edge 412 is formed by the intersection of lower surface 403 with face 406. Edge 413 is formed by the intersection of face 407 with face 406. Edge 414 is formed by the intersection of upper surface 402 with face 407. Edge 415 is formed by the intersection of lower surface 403 with face 407. Edge 416 is formed by the intersection of face 407 with face 408. Edge 417 is formed by the intersection of lower surface 403 with face 408. Edge 423 is formed by the intersection of face 405 with face 408. Edge 425 is formed by the intersection of upper surface 402 with face 404. Edge 426 is formed by the intersection of upper surface 402 with face 405. Edge 431 is formed by the intersection of face 403 with face 404.

Edge 411 and edge 425 intersect at an angle 419. Equivalently, edge 425 forms an angle 419 with respect to the [$\bar{1}$ $\bar{1}$ 0] crystallographic direction. Edge 412 and edge 431 intersect at an angle 419', which is eqaual in magnitude to angle 419. Angle 419 is set to a desired value by photolithographic patterning. Typically, the magnitude of angle 419 is small enough so that the tip can probe small dimensions on the sample, but large enough to give adequate mechanical support to tip 409 (e.g., angle 419 may have a value of 15°).

Edge 410 forms an angle 430 with respect to edge 412. Edge 410 forms an angle 432 with respect to edge 431. Angles 430 and 432 are uniquely determined by angle 419 and by the silicon crysallographic planes. The magnitude of angle 430 is given by arctan [$\sqrt{3}$ tan (angle 419)]. The magnitude of angle 432 is given by arctan [$\sqrt{2}$ sin (angle 419)]. As shown in the top view of FIG. 4(b), edge 426 forms an angle 422 with respect to edge 414. The magnitude of angle 422 is chosen to give an adequate aspect ratio to tip structure 401 while allowing adequate mechanical support (e.g., angle 422 may have a value of approximately 120°). The cantilever tip 409 is at the convergence of three planes: the {111} crystalline plane 406, the lower surface 403 of the cantilever, and face 404 that is perpendicular to both lower surface 403 and upper surface 402. Tip 418 is at the intersection of face 405, face 408, and lower surface 403, and is a remnant of the fabrication process.

Figure 3N:
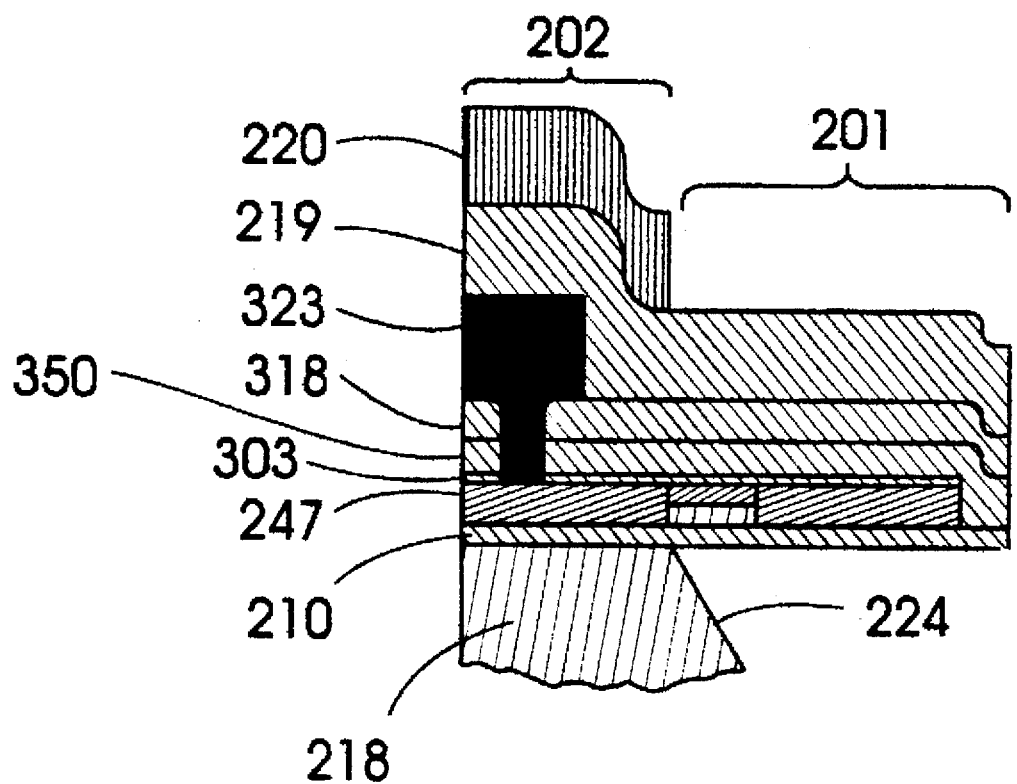
Figure 3O:
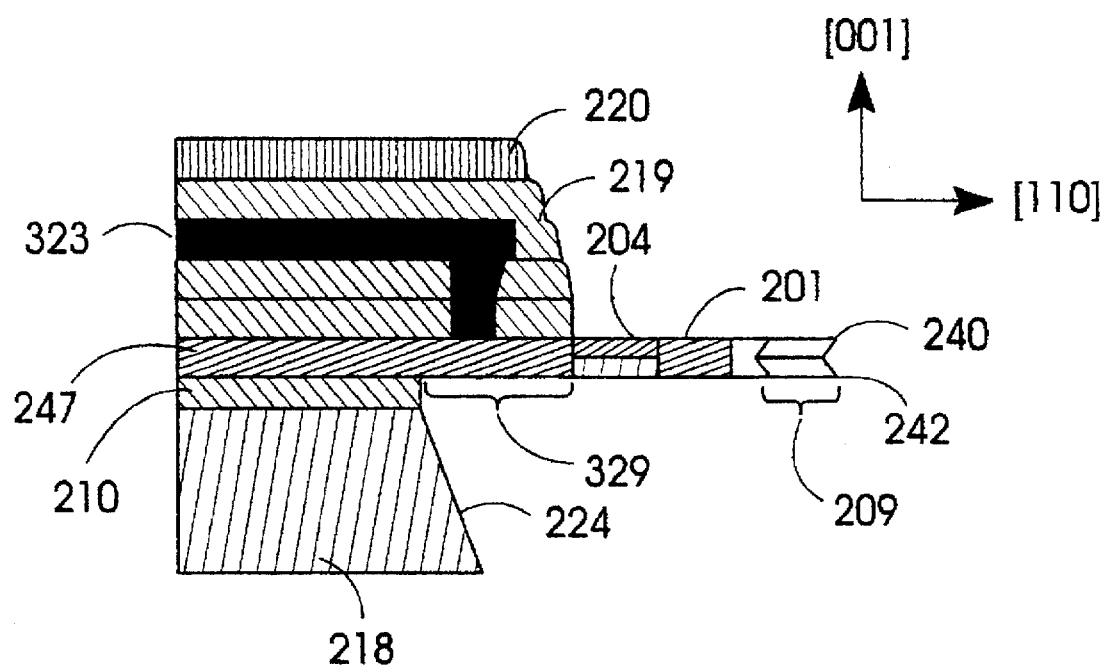
Figure 3P:
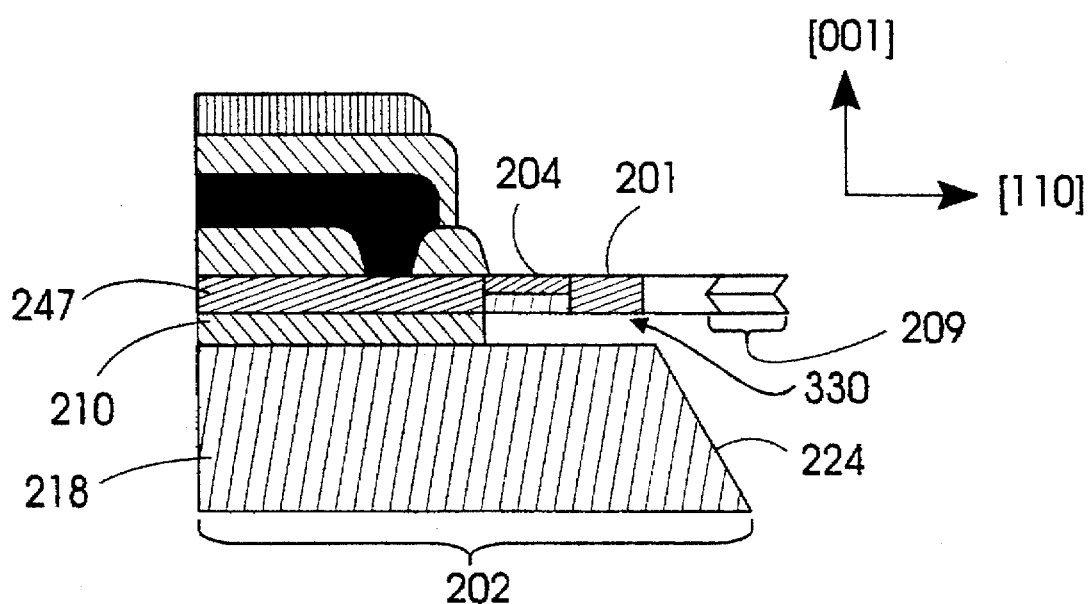
Figure 3Q:
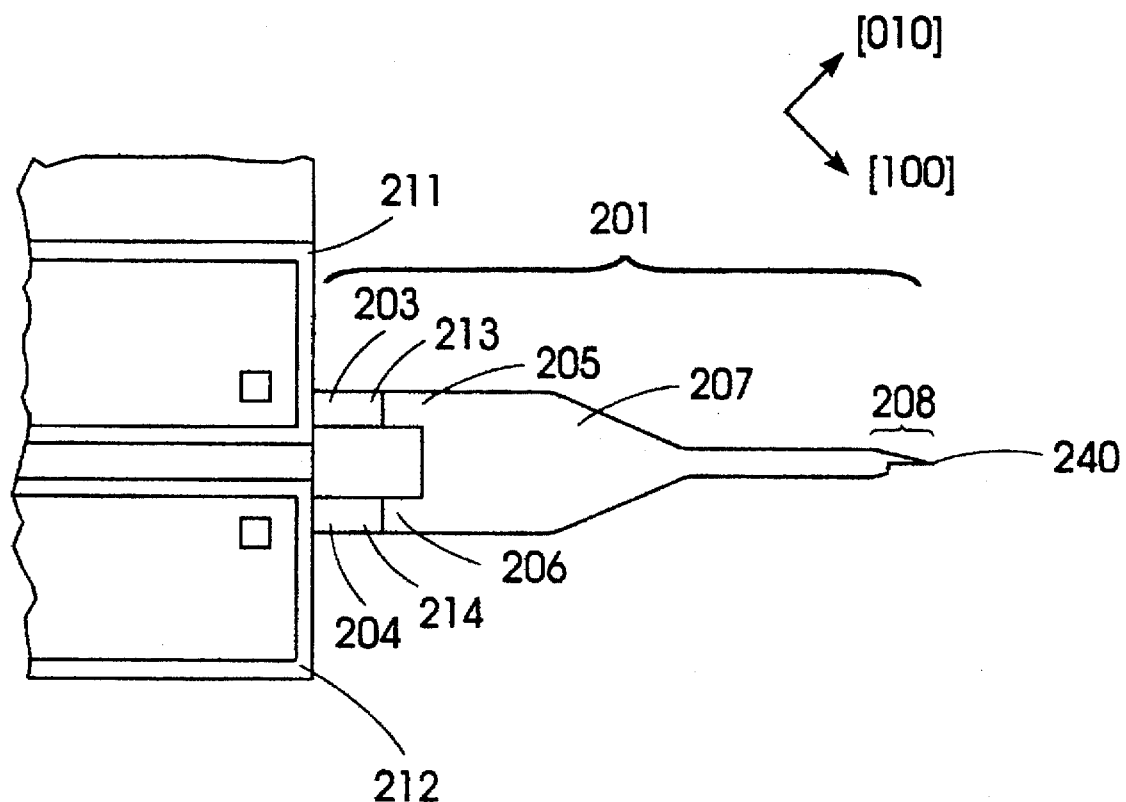
Figure 3R:
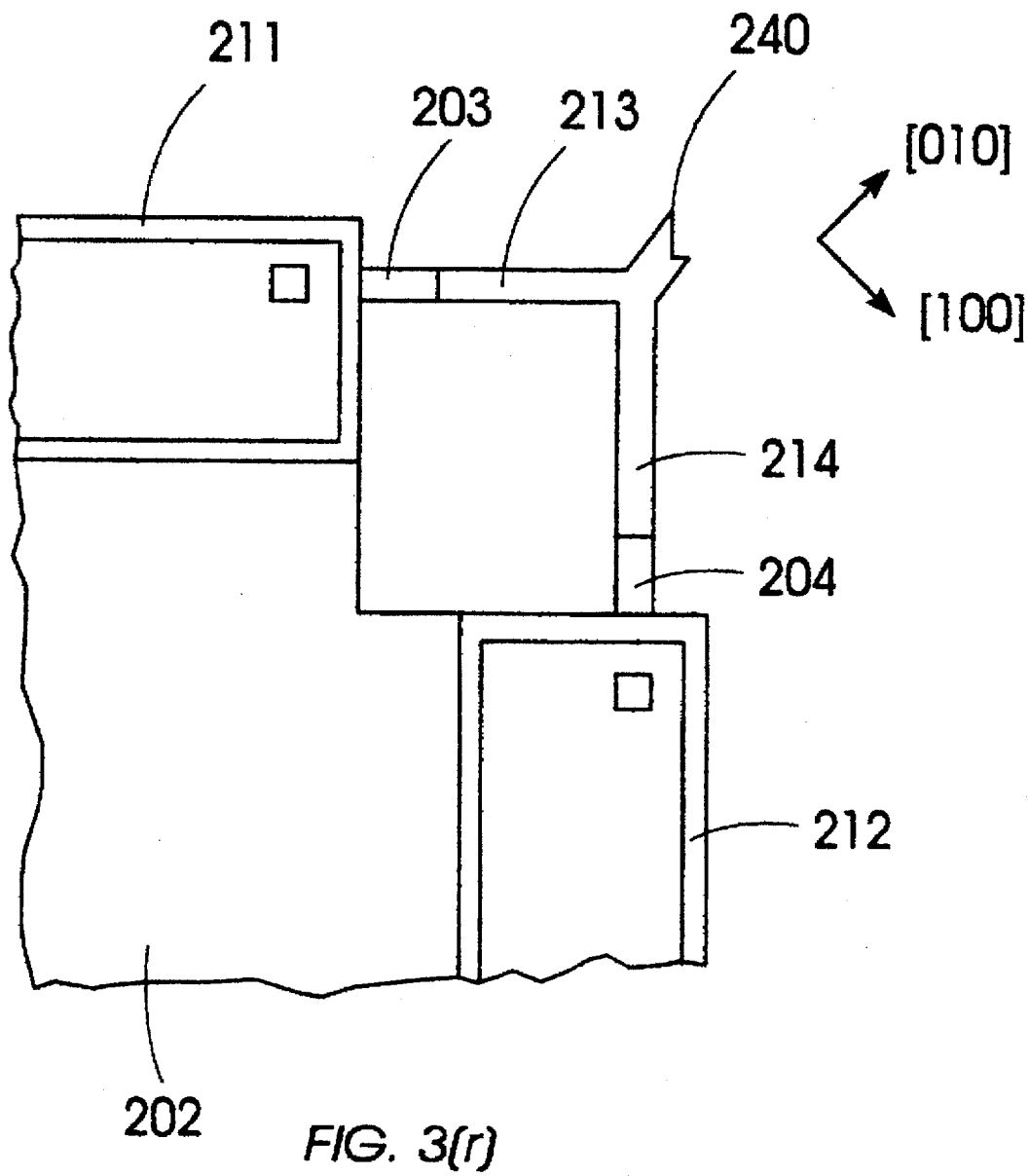
Figure 4A:
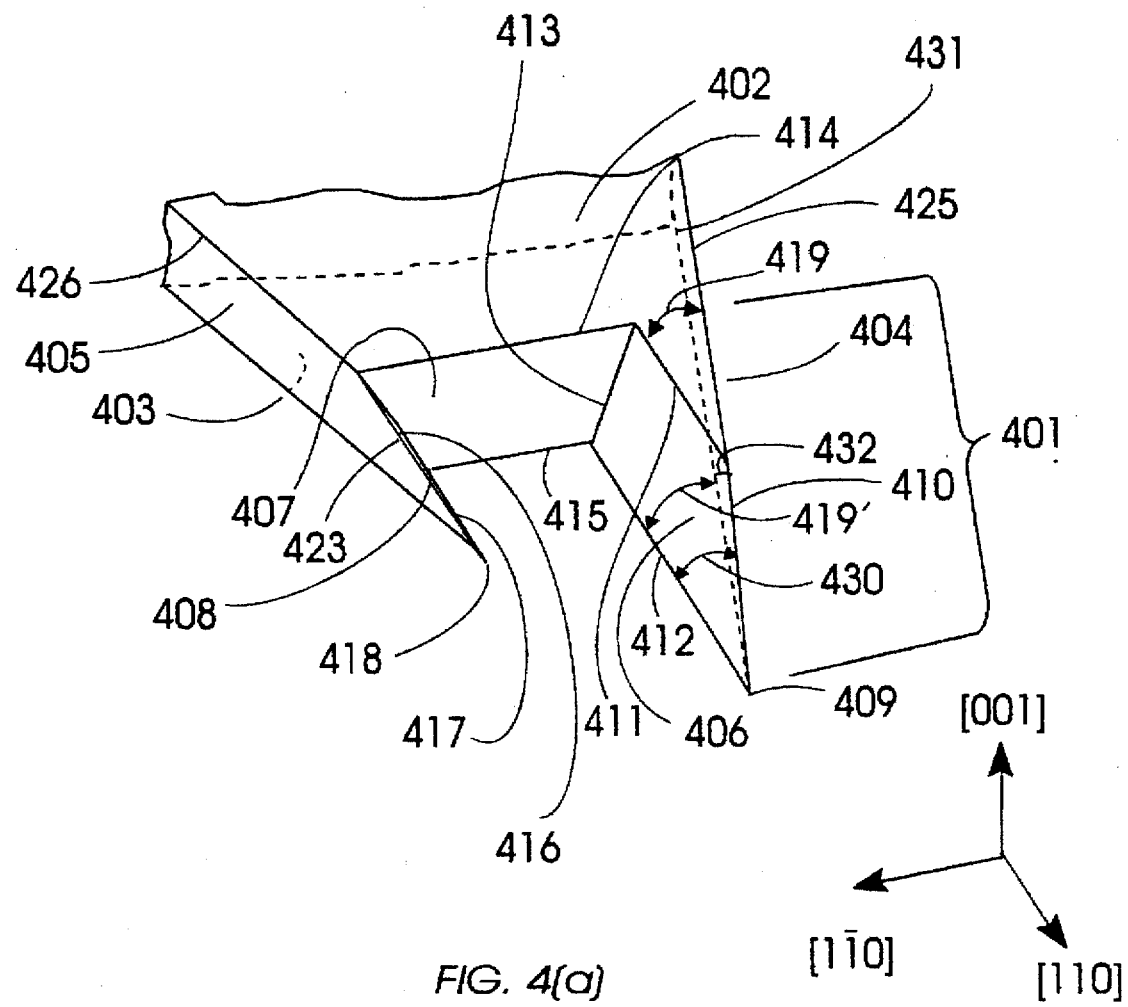
FIG. 4(a) is a perspective view of the tip region of an alternative embodiment of the cantilever according to the present invention.
Figure 4B:
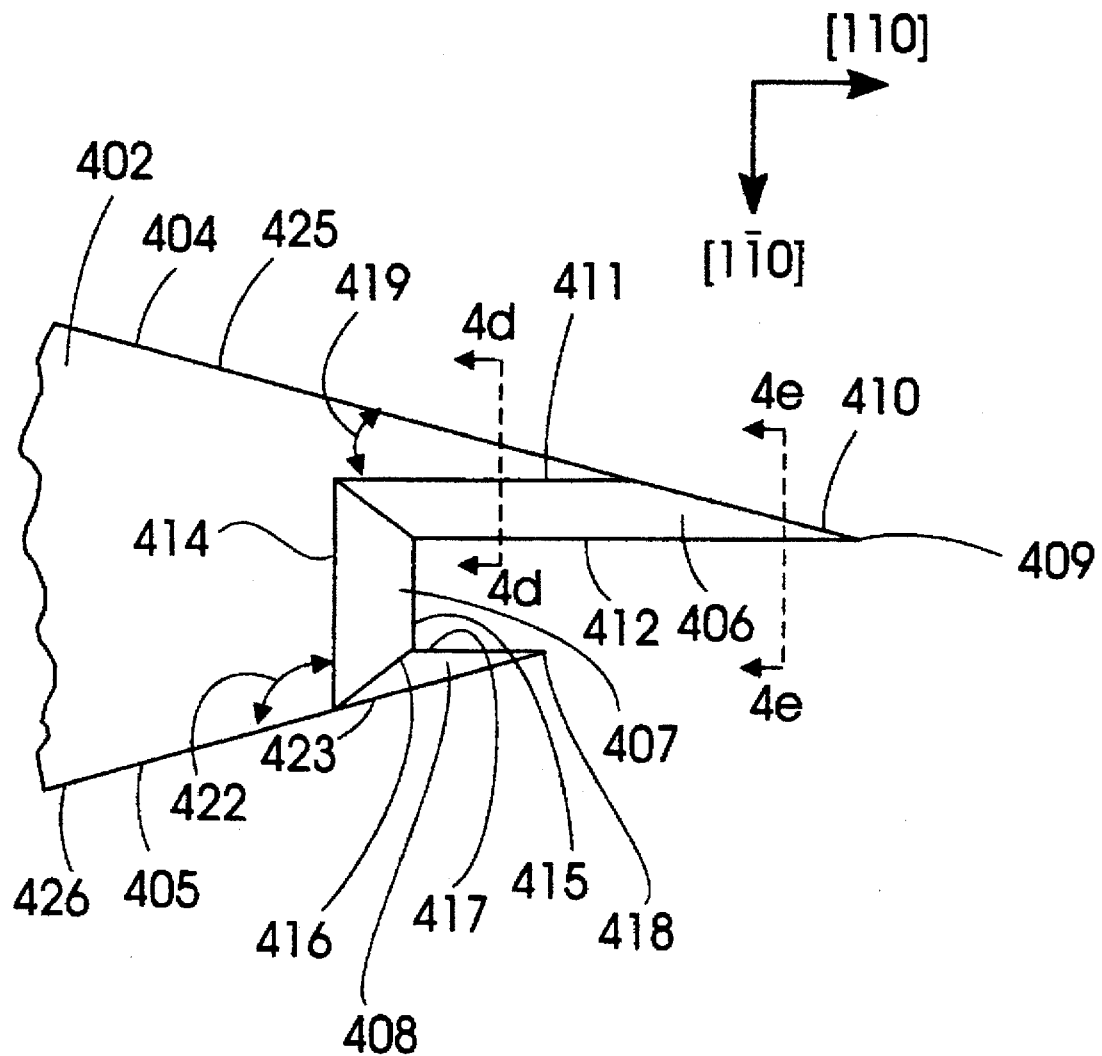
FIG. 4(b) is a top view of the tip region shown in the perspective view of FIG. 4(a).
Figure 4C:
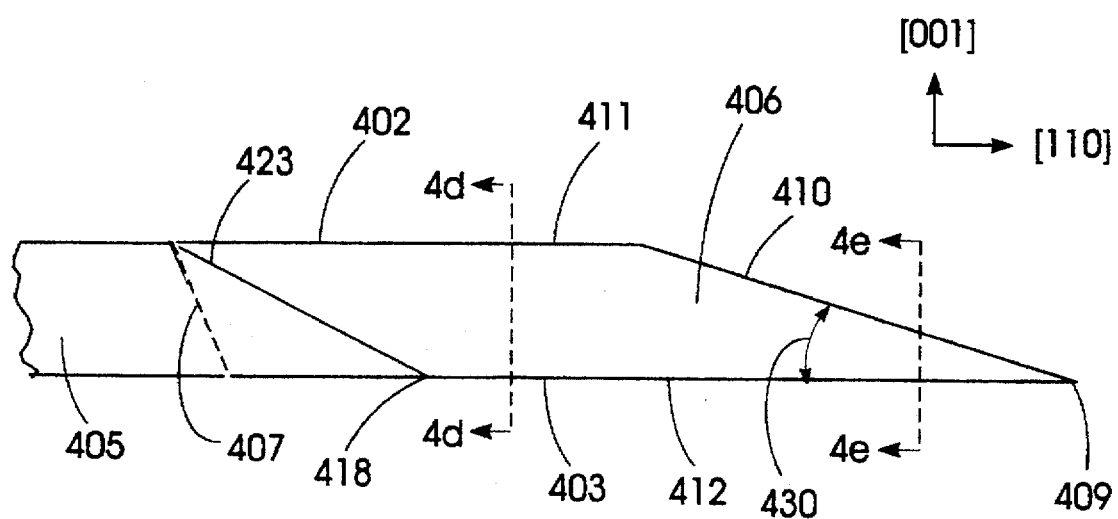
FIG. 4(c) is a side view of the tip region shown in the perspective view of FIG. 4(a).
Figure 4D:
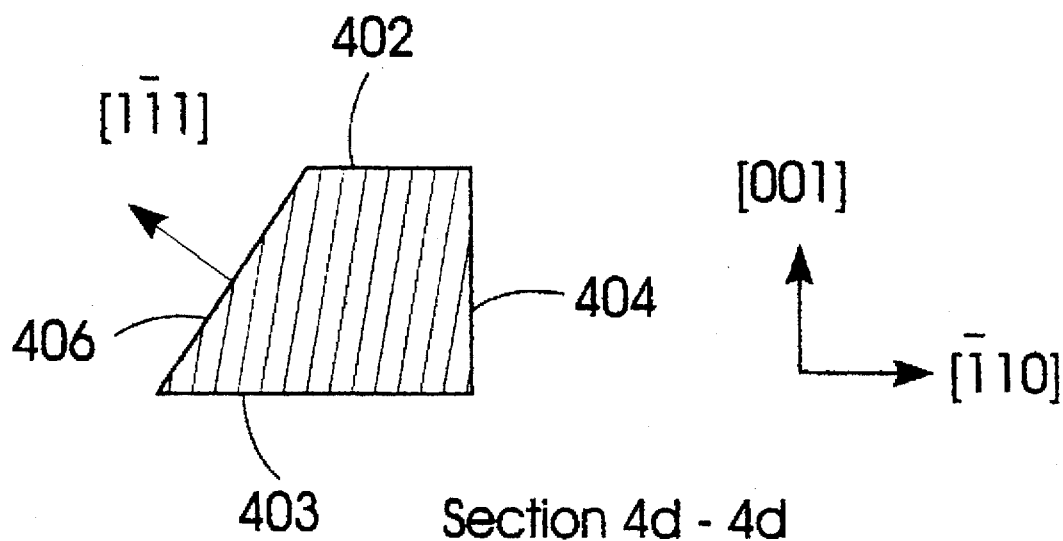
FIG. 4(d) is a sectional view of the section 4d—4d of FIGS. 4(b) and 4(c).
Figure 4E:
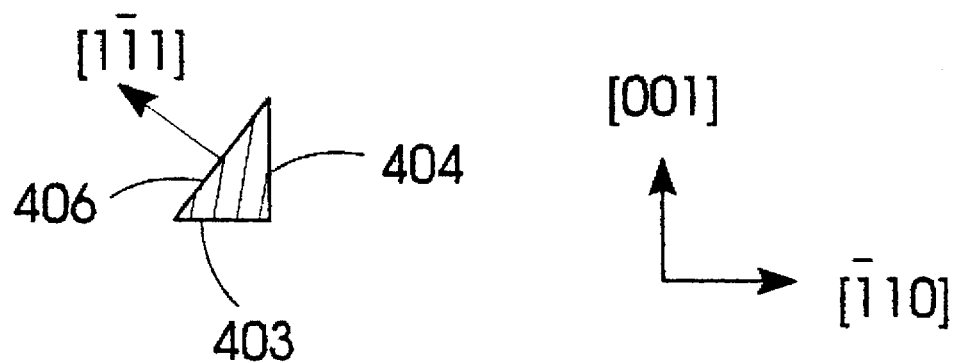
FIG. 4(e) is a sectional view of the section 4e—4e of FIGS. 4(b) and 4(c).

Fabrication of the embodiment of FIGS. 4(a)–4(e) may be achieved with a variation of the fabrication method for the first embodiment, which was described with respect to FIGS. 3(a)–3(n). Specifically, referring to FIG. 3(g), for the embodiment of FIGS. 4(a)–4(e), no plasma etch of the silicon layer is performed. Instead, the photoresist 319 is next removed using conventional techniques.

Figure 5A:
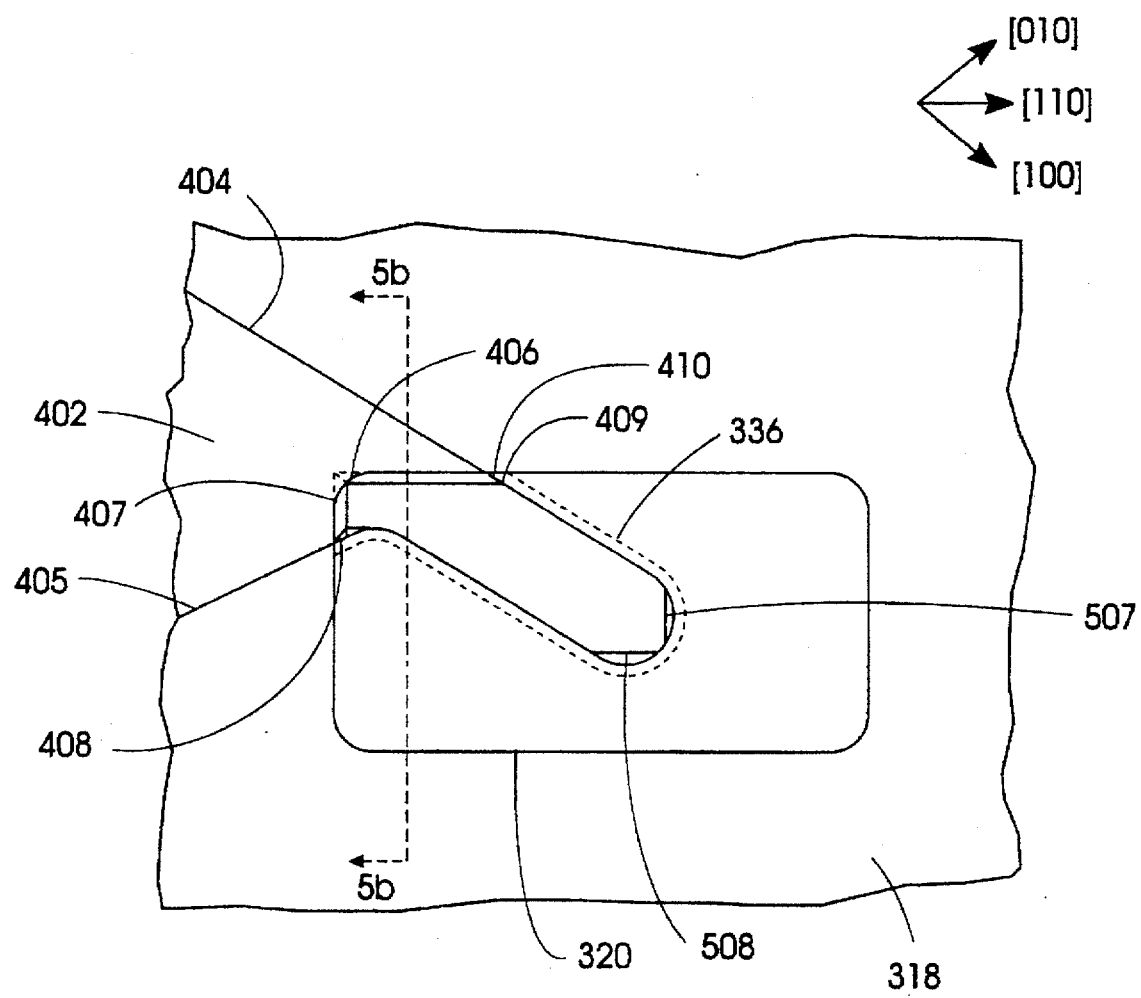
FIGS. 5(a)–5(b) are views illustrating steps in the fabrication of the tip region of the alternative embodiment of the cantilever shown in FIGS. 4(a)–4(e).
Figure 5B:
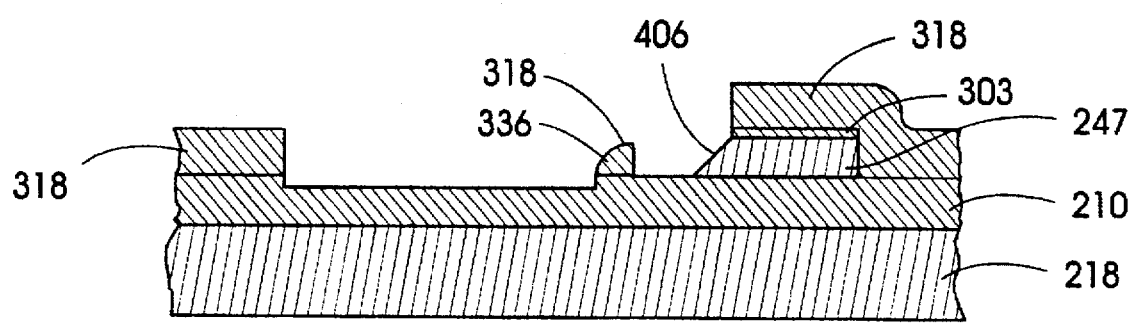

Next, referring to FIG. 5(a), which shows a top view of tip structure 401, and FIG. 5(b), which is a cross-sectional view through the line 5b—5b of FIG. 5(a), substrate 301 is subjected to a wet anisotropic etch which preferentially etches in the <100> directions of silicon, etches at a greatly reduced rate in the <111> directions, and which etches LTO layer 318 and silicon dioxide layer 210 at a negligible rate. The duration of this etch is such that in exposed region 320, the etchant may proceed in the [0 0 $\bar{1}$] direction through the thickness of silicon sheet 247. The anisotropic etchant stops on stable {111} planes 406, 407, 408, 507, and 508. This etch forms tip structure 401 shown in FIGS. 4(a)–4(e). Stable {111} planes 408, 507, and 508 are bounded laterally by LTO sidewall structure 336. The silicon structures associated with stable planes 507 and 508 are remnants of the fabrication process and are discarded in subsequent processing steps. Next, the manufacturing process continues as described in the first preferred embodiment with the deposition of LTO layer 350.

The tip-making processes described above may also be used to make closely-spaced tips on different cantilevers. Pairs of tips may be useful for passing small currents through the surface of a sample. Arrays of cantilevers may be made using the processes described above. The lengths of the cantilevers may be staggered so as to create a slight angle of inclination of the substrate relative to the sample. Parallel operation in arrays of cantilevers may be used to increase the data transfer rate from that of a single cantilever.

The tip-making processes described above may also be used in cantilevers in which piezoresistors are formed with n-type dopants. The tip-making processes described above may also be used in cantilevers in which the lengthwise axes of the legs of the cantilever are oriented in a direction other than a {110} crystallographic direction. The tip-making processes described above may also be used in cantilevers for which silicon sheet 247 has a crystallographic orientation such that the top and bottom surfaces of the cantilever are planes other than a {100} crystallographic plane. If bonded SOI wafers are used, then the silicon substrate need not have the same crystallographic orientation as does the silicon surface layer 247.

The tip-making processes described above may be combined with techniques for adding thin coatings to silicon tips to increase the electric field-induced emission of electrons from the tip. For example, Liu et al., "Electron Emission From Diamond Coated Silicon Field Emitters", *Appl. Phys. Lett.*, Vol. 65, No. 22, Nov. 28, 1994, pp. 2842–2844, describe the increased field emission of electrons from silicon tips that have been coated with a thin diamond film. The increased electron emission from a coated silicon tip can facilitate certain forms of scanning probe lithography.

The tip-making processes described above may be combined with techniques for adding thin coatings to silicon tips to increase the hardness of the tip surface. A harder tip surface will reduce tip wear. Since diamond is the hardest material known, diamond tips are often used on AFM cantilevers. Silicon tips with diamond coatings will have improved wear characteristics over bare silicon tips. Other thin films, such as silicon nitride, silicon carbide, boron nitride, boron carbide, or diamond-like carbon, may also be used as coating material on the silicon tip.

The tip-making processes described above may also be combined with techniques to make the tip responsive to magnetic forces. For example, the previously-cited Grütter et al. article describes the use of a silicon cantilever coated with a thin film of magnetic material, such as NiFe and CoPtCr, to sense magnetic forces and thereby perform magnetic force microscopy. Having the piezoresistive sensor integrated onto the cantilever with this type of coated tip simplifies the technique compared to conventional magnetic force microscopy. In addition, the ability to make in-plane tips with small cone angles enhances the resolution of this type of noncontact technique.

Variations and Advantages of the Present Invention

With an in-plane tip integral with the cantilever where one of the planes forming the tip is coplanar with the cantilever, the mass near the end of the cantilever is reduced, resulting in the ability to operate at higher frequencies. The tip processes described above can have arbitrary aspect ratios, i.e., ratio of the length of the tip to its width at the tip base, with the aspect ratio being set by conventional photolithographic patterning aligned to the crystal orientation of the silicon layer. The wet anisotropic etch of the tip formation process results in a tip with a stable length and shape that is not strongly dependent on etch time. The tip formation process produces sharp tips; i.e., if the tip is approximated as being part of a spherical surface the radius of curvature can be less than 10 nm.

Tips can be formed from thin silicon layers of well-controlled thickness, which is an advantage over the subtractive process used in the formation of out-of-plane tips. Having thin cantilevers is advantageous for the formation of cantilevers with high-frequency response and low-spring constant.

The in-plane tip formation process allows lithographic patterning to be performed on a surface which is relatively planar in comparison to one using out-of-plane tips. The greater planarity of the tips allows for finer lithographic patterning, resulting in smaller feature size.

The in-plane tips have advantages in tip wear relative to high-aspect ratio out-of-plane tips. Pyramid-shaped tips as in the prior art have a more broad shape that may reduce wear, but they are also broad in both directions. The in-plane high-aspect ratio tips of the present invention have a broad angle only in line with the cantilever and this angle is set by the angle of attack of the cantilever to the sample. Thus, the in-plane high-aspect ratio tips described above may be used to image structures with steep sidewalls when the cantilever motion across the surface of the sample is in the direction perpendicular to the line of the cantilever.

The surface release process obtains a cantilever with length more readily controllable than that obtained by etching through the entire wafer. With shorter lengths being attainable, cantilevers with a desired spring constant can be made thinner, allowing a higher frequency response. The surface release process also allows a greater packing density of cantilevers on a wafer than do the standard art means of fabricating silicon AFM cantilevers by etching through the entire wafer. Etching through the wafer requires device separations of the order of the thickness of the wafer. The dicing method assures that the tips will be located near the edge of the support chip.

As used herein, the term "scanning" is meant to refer to movement of the AFM tip relative to the sample, and is not limited merely to conventional AFM imaging. Thus in the thermomechanical data storage writing application and the SPL application, as well as in the conventional imaging application and the data storage reading application, the cantilever tip of the AFM system is described as scanning the surface of the sample. The scanning can be done either with the tip in contact with the surface, or with the tip in close proximity or near-contact to the surface. Also as described herein, the term "cantilever" is meant to refer to a cantilever mounted in the AFM system, as well as to a cantilever prior to its incorporation into a larger system.

While the preferred embodiments of the present invention have been illustrated in detail, it should be apparent that modifications and improvements may be made to the invention without departing from the spirit and scope of the invention as described in the following claims.

What is claimed is:

1. An atomic force microscope system for scanning the surface of a sample, the system comprising:
   a sample holder;
   a cantilever formed of single-crystal silicon and having a fixed end, generally parallel top and bottom surfaces, and a length terminated at the free end to form a tip, the tip being integral with the single-crystal silicon forming the cantilever and being the convergence of three planes, a first of said three planes being the top or bottom surface of the cantilever, a second of said three planes other than the top and bottom surfaces of the cantilever being a {111} crystalline plane, and a third of said three planes being a plane generally perpendicular to the top and bottom surfaces of the cantilever;
   a support connected to the fixed end of the cantilever for supporting the cantilever with the cantilever's top and bottom surfaces forming an acute angle with the surface of said sample when said sample is held in the sample holder; and
   an actuator for moving the cantilever support and the sample holder relative to one another, whereby the cantilever tip scans the surface of said sample held by the sample holder.

2. The system according to claim 1 wherein the silicon cantilever contains a piezoresistive region, and further comprising electrical resistance detection circuitry coupled to the piezoresistive region of the cantilever for detecting changes in resistance of the piezoresistive region in response to deflection of the cantilever tip, whereby incongruencies on the surface of said sample that cause said deflection of the cantilever tip during scanning are detected by the electrical resistance detection circuitry.

3. The system according to claim 2 further comprising a sample to be scanned, the sample having a surface with incongruencies representing data, whereby the electrical resistance detection circuitry detects data recorded on the surface of the sample.

4. The system according to claim 3 wherein the sample is a disk, and further comprising a motor coupled to the sample holder for rotating the disk about an axis generally perpendicular to the disk surface to be scanned.

5. The system according to claim 1 further comprising means for heating the cantilever tip.

6. The system according to claim 5 wherein the cantilever includes an electrical conductor between the fixed end and a region near the tip, and wherein the means for heating the tip comprises means for applying electrical current through said electrical conductor to said tip.

7. The system according to claim 6 further comprising a sample to be scanned, the sample having a heat-deformable surface, whereby incongruencies are formed on the sample surface by the heated tip during scanning.

8. The system according to claim 1 wherein the cantilever includes an electrical conductor connected to the tip, and further comprising a sample to be scanned, the sample having a surface for lithographic patterning, and means coupled to the electrical conductor for applying an electrical potential between the cantilever tip and the sample to modify the surface of the sample during scanning.

9. The system according to claim 8 wherein the surface for lithographic patterning is a surface for patterning with an oxide film, and wherein the means for applying an electrical potential between the cantilever tip and the sample forms said oxide film on the surface of the sample during scanning.

10. The system according to claim 8 wherein the surface for lithographic patterning forms a polymer layer that undergoes a chemical change in response to exposure to electrons from said tip.

11. The system according to claim 1 further comprising a semiconductor sample having a layer of material on its surface to be scanned for lithographic patterning, and wherein the cantilever tip removes said layer of material during scanning to form a lithographic pattern.

12. The system according to claim 1 wherein the cantilever includes two generally parallel spaced-apart legs extending from the fixed end toward the free end.

13. The system according to claim 1 wherein the cantilever is formed of two legs oriented generally perpendicular to one another so as to form a generally right angle and wherein the tip is located generally at the apex of the right angle connection of the two legs.

14. The system according to claim 1 wherein one of said three planes other than the top and bottom surfaces of the cantilever is a {111} crystalline plane.

15. The system according to claim 14 wherein the third of said three planes is a plane generally perpendicular to the top and bottom surfaces of the cantilever.

16. The system according to claim 15 wherein the top and bottom surfaces of the cantilever are {100} crystalline planes.

17. The system according to claim 1 wherein the cantilever top or bottom surface that converges to the cantilever tip is the surface that faces the sample when the sample is held in the sample holder.

18. The system according to claim 1 wherein the cantilever top or bottom surface that converges to the cantilever tip is the surface that faces away from the sample when the sample is held in the sample holder.

19. The system according to claim 1 wherein the single-crystal silicon tip is coated with a film of material selected from the group consisting of diamond, silicon carbide, silicon nitride, boron carbide, and boron nitride, whereby the wear resistance of the tip is improved.

20. The system according to claim 1 wherein the single-crystal silicon tip is coated with a film of gold or diamond, whereby the field emission of electrons from the tip is improved.

21. The system according to claim 1 wherein the single-crystal silicon tip is coated with a film of magnetic material, thereby enabling the sensing of magnetic forces between the tip and the sample where the sample is held in the sample holder.

22. An atomic force microscope system for scanning the surface of a sample, the system comprising:

a sample holder;

a cantilever formed of single-crystal silicon and having a fixed end, generally parallel top and bottom surfaces, and a length terminated at the free end to form a tip, the tip being integral with the single-crystal silicon forming the cantilever and being the convergence of three planes, a first of said three planes being the top or bottom surface of the cantilever, a second of said three planes other than the top and bottom surfaces being a {111} crystalline plane, and a third of said three planes being a plane generally perpendicular to the top and bottom surfaces of the cantilever;

a support connected to the fixed end of the cantilever for supporting the cantilever with the cantilever's top and bottom surfaces forming an acute angle with the surface of said sample when said sample is held in the sample holder; and an actuator for moving the cantilever support and the sample holder relative to one another, whereby the cantilever tip scans the surface of said sample held by the sample holder; and wherein the single-crystal silicon cantilever contains a piezoresistive region, and further comprising electrical resistance detection circuitry coupled to the piezoresistive region of the cantilever for detecting changes in resistance of the piezoresistive region in response to deflection of the cantilever tip during scanning.

23. The system according to claim 22 wherein the top and bottom surfaces of the cantilever are {100} crystalline planes.

24. The system according to claim 22 wherein said first of said three planes of the cantilever is the surface that faces the sample when the sample is held in the sample holder.

25. The system according to claim 22 wherein said first of said three planes of the cantilever is the surface that faces away from the sample when the sample is held in the sample holder.

* * * * *